(12) United States Patent
Shuman et al.

(10) Patent No.: US 11,906,643 B2
(45) Date of Patent: Feb. 20, 2024

(54) OPTIMIZING TRANSMISSION OF A SIDELINK SYNCHRONIZATION SIGNAL BY A WIRELESS DEVICE

(71) Applicant: QUALCOMM Incorporated, San Diego, CA (US)

(72) Inventors: Mohammed Ataur Rahman Shuman, San Diego, CA (US); Soumya Das, San Diego, CA (US); Mohammad Nekoui, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 213 days.

(21) Appl. No.: 17/644,042

(22) Filed: Dec. 13, 2021

(65) Prior Publication Data

US 2023/0184870 A1 Jun. 15, 2023

(51) Int. Cl.
| | | |
|---|---|---|
| *H04W 76/28* | (2018.01) | |
| *G01S 5/00* | (2006.01) | |
| *G01S 19/51* | (2010.01) | |
| *H04W 56/00* | (2009.01) | |
| *H04W 64/00* | (2009.01) | |

(52) U.S. Cl.
CPC ............ *G01S 5/0036* (2013.01); *G01S 19/51* (2013.01); *H04W 56/006* (2013.01); *H04W 64/006* (2013.01)

(58) Field of Classification Search
CPC .............................. G01S 5/0036; H04W 76/28

USPC ....................................................... 455/456.1
See application file for complete search history.

(56) References Cited

U.S. PATENT DOCUMENTS

| | | | |
|---|---|---|---|
| 2021/0037493 A1* | 2/2021 | Gulati | H04W 56/0025 |
| 2021/0176720 A1* | 6/2021 | Chae | H04W 92/18 |
| 2021/0195522 A1* | 6/2021 | Sridharan | H04W 76/28 |
| 2021/0227480 A1 | 7/2021 | Sridharan et al. | |

FOREIGN PATENT DOCUMENTS

| | | |
|---|---|---|
| WO | 2020033795 A1 | 2/2020 |
| WO | 2020063857 A1 | 4/2020 |
| WO | 2021022017 A1 | 2/2021 |

OTHER PUBLICATIONS

International Search Report and Written Opinion—PCT/US2022/080052—ISA/EPO—dated Mar. 15, 2023.

\* cited by examiner

*Primary Examiner* — Qutbuddin Ghulamali
(74) *Attorney, Agent, or Firm* — QUALCOMM Incorporated

(57) ABSTRACT

Disclosed are techniques for performing wireless communication. In some aspects, a wireless communication device may determine that a prospective position of the wireless communication device is in a geographic area associated with a deficient global navigation satellite system (GNSS) signal. In some cases, the wireless communications device can transmit a sidelink synchronization signal to at least one user equipment (UE) device that is located within the geographic area associated with the deficient GNSS signal.

28 Claims, 16 Drawing Sheets

OPTIMIZING TRANSMISSION OF A SIDELINK SYNCHRONIZATION SIGNAL BY A WIRELESS DEVICE

FIELD OF THE DISCLOSURE

Aspects of the present disclosure generally relate to wireless communication. In some implementations, examples are described for optimizing transmission of a sidelink synchronization signal by a wireless device.

BACKGROUND OF THE DISCLOSURE

Wireless communications systems are deployed to provide various telecommunication services, including telephony, video, data, messaging, broadcasts, among others. Wireless communications systems have developed through various generations, including a first-generation analog wireless phone service (1G), a second-generation (2G) digital wireless phone service (including interim 2.5G networks), a third-generation (3G) high speed data, Internet-capable wireless service, and a fourth-generation (4G) service (e.g., Long-Term Evolution (LTE), WiMax). There are presently many different types of wireless communications systems in use, including cellular and personal communications service (PCS) systems. Examples of known cellular systems include the cellular Analog Advanced Mobile Phone System (AMPS), and digital cellular systems based on code division multiple access (CDMA), frequency division multiple access (FDMA), time division multiple access (TDMA), the Global System for Mobile communication (GSM), etc.

A fifth generation (5G) mobile standard calls for higher data transfer speeds, greater numbers of connections, and better coverage, among other improvements. The 5G standard (also referred to as "New Radio" or "NR"), according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G/LTE standard. Furthermore, signaling efficiencies should be enhanced and latency should be substantially reduced compared to current standards.

Aspects of LTE, 5G, and/or other communications protocols may support direct communications between devices, which may be referred to as sidelink communications. As used herein, sidelink or sidelink communications generally refers to any direct device-to-device communication protocol. For example, the term sidelink may refer to 3GPP sidelink (e.g., using a PC5 sidelink interface). Sidelink may also refer to a Wi-Fi protocol for direct device-to-device communications, referred to as Dedicated Short Range Communication (DSRC) protocol. As the demand for mobile broadband access and general communications continues to increase, further improvements in 5G, LTE, and other radio access technologies, as well as other communications technologies (e.g., WiFi, etc.), remain useful.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems, methods, apparatuses, and computer-readable media for performing wireless communication. According to at least one example, a method is provided for wireless communication. The method may include determining that a prospective position of a user equipment (UE) device is in a geographic area associated with a deficient synchronization source signal; and transmitting a sidelink synchronization signal to at least one other UE device that is located within the geographic area associated with the deficient synchronization source signal.

In another example, a wireless communication device is provided that includes at least one memory, at least one transceiver, and at least one processor (e.g., configured in circuitry) communicatively coupled to the at least one memory and the at least one transceiver. The at least one processor may be configured to: determine that a prospective position of the wireless communication device is in a geographic area associated with a deficient synchronization source signal; and transmit a sidelink synchronization signal to at least one user equipment (UE) device that is located within the geographic area associated with the deficient synchronization source signal.

In another example, a non-transitory computer-readable medium of a wireless communication device is provided that includes stored thereon at least one instruction that, when executed by one or more processors, may cause the one or more processors to: determine that a prospective position of a wireless communication device is in a geographic area associated with a deficient synchronization source signal; and transmit a sidelink synchronization signal to at least one user equipment (UE) device that is located within the geographic area associated with the deficient synchronization source signal.

In another example, an apparatus for wireless communication is provided. The apparatus may include: means for determining that a prospective position of a user equipment (UE) device is in a geographic area associated with a deficient synchronization source signal; and means for transmitting a sidelink synchronization signal to at least one other UE device that is located within the geographic area associated with the deficient synchronization source signal.

In another example, a method for wireless communications is provided. The method may include: receiving, by a user equipment (UE) device, a request to associate with at least one other UE device to form a UE platoon; identifying the UE device as a sidelink synchronization source for the UE platoon based on a position of the UE device relative to the at least one other UE device; and transmitting a first sidelink synchronization signal while at least a portion of the UE platoon is in a geographic area associated with a deficient synchronization source signal.

In another example, a wireless communication device is provided that includes at least one memory, at least one transceiver, and at least one processor (e.g., configured in circuitry) communicatively coupled to the at least one memory and the at least one transceiver. The at least one processor may be configured to: receive a request to associate with at least one UE device to form a UE platoon; identify the wireless communication device as a sidelink synchronization source for the UE platoon based on a position of the wireless communication device relative to the at least one UE device; and transmit a first sidelink synchronization signal while at least a portion of the UE platoon is in a geographic area associated with a deficient synchronization source signal.

In another example, a non-transitory computer-readable medium of a wireless communication device is provided that includes stored thereon at least one instruction that, when executed by one or more processors, may cause the one or more processors to: receive a request to associate with at least one UE device to form a UE platoon; identify a wireless communication device as a sidelink synchronization source for the UE platoon based on a position of the wireless communication device relative to the at least one UE device; and transmit a first sidelink synchronization signal while at least a portion of the UE platoon is in a geographic area associated with a deficient synchronization source signal.

In another example, an apparatus for wireless communication is provided. The apparatus may include: means for receiving, by a user equipment (UE) device, a request to associate with at least one other UE device to form a UE platoon; means for identifying the UE device as a sidelink synchronization source for the UE platoon based on a position of the UE device relative to the at least one other UE device; and means for transmitting a first sidelink synchronization signal while at least a portion of the UE platoon is in a geographic area associated with a deficient synchronization source signal Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
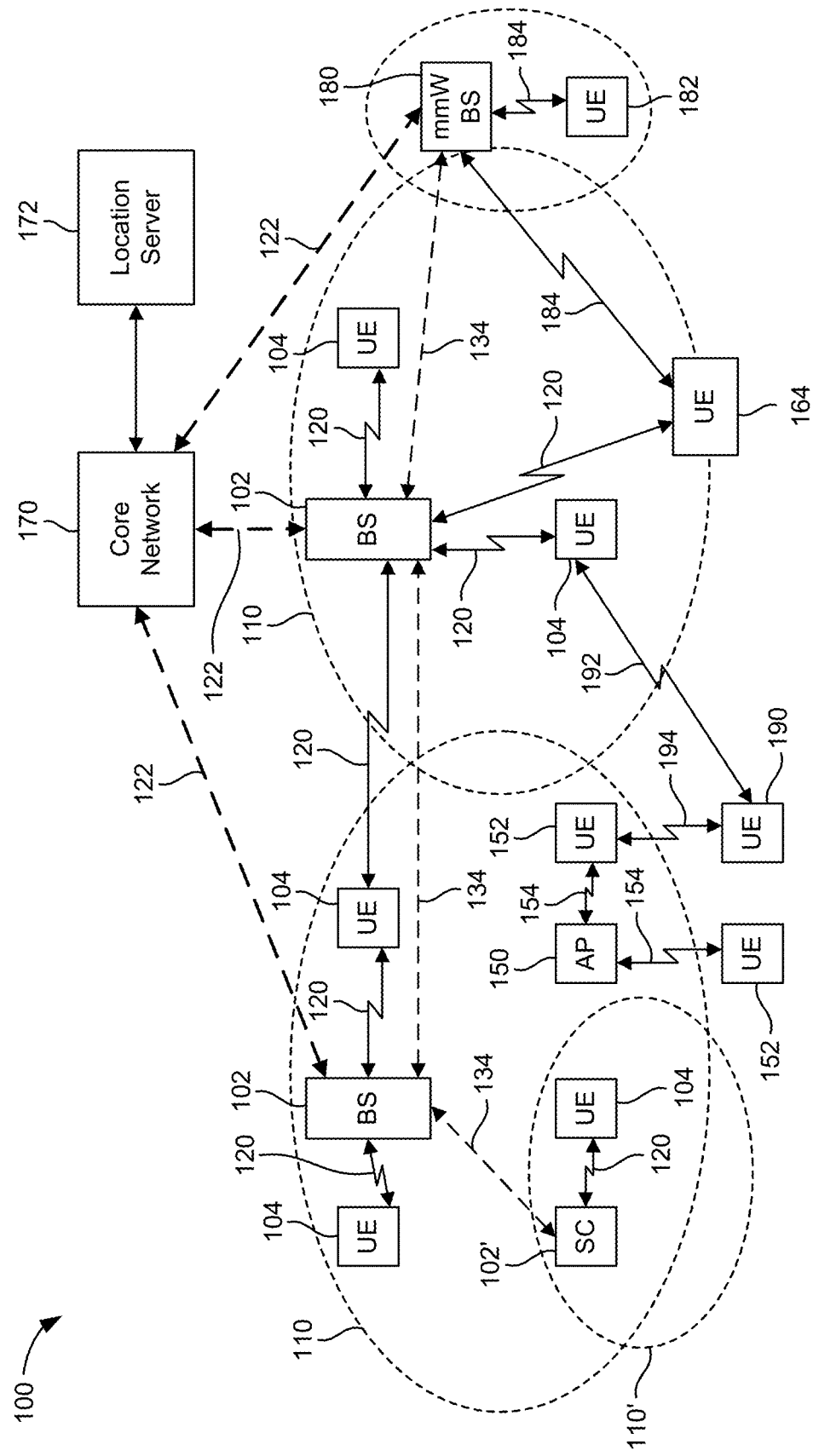
FIG. 1 illustrates an exemplary wireless communications system, according to aspects of the disclosure.

Certain aspects and embodiments of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects and embodiments described herein may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the scope of the application as set forth in the appended claims.

Wireless communication networks are deployed to provide various communication services such as voice, video, packet data, messaging, broadcast, and the like. A wireless communication network may support both access links and sidelinks for communication between wireless devices. An access link may refer to any communication link between a client device (e.g., a user equipment (UE), a station (STA), or other client device) and a base station (e.g., a 3GPP gNB, a 3GPP eNB, a Wi-Fi access point (AP), or other base station). For example, an access link may support uplink signaling, downlink signaling, connection procedures, etc.

A sidelink may refer to any communication link between client devices (e.g., UEs, STAs, etc.). For example, a sidelink may support device-to-device (D2D) communications, vehicle-to-everything (V2X) and/or vehicle-to-vehicle (V2V) communications, message relaying, discovery signaling, beacon signaling, or any combination of these or other signals transmitted over-the-air from one UE to one or more other UEs. In some examples, sidelink communications may be transmitted using a licensed frequency spectrum or an unlicensed frequency spectrum (e.g., 5 GHz or 6 GHz). As used herein, the term sidelink may refer to 3GPP sidelink (e.g., using a PC5 sidelink interface), Wi-Fi direct communications (e.g., according to a Dedicated Short Range Communication (DSRC) protocol), or using any other direct device-to-device communication protocol.

In some configurations, a client device may implement sidelink communications using a sidelink synchronization signal for demodulating data. In some examples, the source of the sidelink synchronization signal can be a Global Navigation Satellite System (GNSS) signal, a signal from a base station, a sidelink synchronization signal transmitted by another client device, or an internal clock. In some cases, a client device selects the source of the sidelink synchronization signal based on a priority (e.g., GNSS signal having a highest priority). In some examples, a client device may select the source of the sidelink synchronization signal based on the priority and/or the reference signal received power (RSRP) of the signal.

As noted above, a GNSS signal can be used as the preferred synchronization signal source for sidelink communications. In some instances, client devices may be located in a geographic area where the GNSS signal is unavailable or unreliable. For example, client devices may be located inside of a tunnel, in a parking garage, in a dense urban area (e.g., an urban canyon), a forest, etc. In such cases, client devices need to utilize an alternative sidelink synchronization signal source (e.g., base station, another UE, or an internal clock).

In some aspects, an alternative sidelink synchronization signal source may be provided by a client device. For example, a client device that is synchronized with a GNSS satellite or a base station can be configured to transmit the sidelink synchronization signal to propagate established timing. In some cases, a client device that is not synchronized with GNSS or a base station may independently transmit a sidelink synchronization signal.

While blanket transmission of sidelink synchronization signal by client devices may be helpful in areas with an unreliable GNSS signal, such a configuration presents additional concerns. For example, uncoordinated transmission of a sidelink synchronization signal by various client devices may result in packet collisions and/or signal interference. In addition, uncoordinated transmission of sidelink synchronization signal by various client devices prevents client devices from proactively forming a cluster (e.g., a UE platoon) that may designate a single device as the source of the sidelink synchronization signal.

Furthermore, a client device that receives a GNSS signal may only transmit a sidelink synchronization signal when it is not associated with a base station or when the base station signal quality drops below a threshold level. Similarly, a client device that receives a sidelink synchronization signal from another client device (e.g., a SyncRef UE) may only transmit a sidelink synchronization signal when the signal quality of the SyncRef UE drops below a threshold value. Lastly, a client device may transmit a sidelink synchronization signal that is based on its internal clock when no other sidelink synchronization signal source is available.

Systems, apparatuses, processes (also referred to as methods), and computer-readable media (collectively referred to as "systems and techniques") are described herein for configuring a client device to transmit a sidelink synchronization signal. The systems and techniques provide the ability for client devices (e.g., UEs) to proactively identify geographic areas having a deficient sidelink synchronization source and transmit a sidelink synchronization signal to facilitate sidelink communications within those geographic areas. The system and techniques further provide the ability for client devices to form a cluster (e.g., platoon) to intelligently select a client device that can transmit the sidelink synchronization signal. As noted above, the sidelink communications may be performed according to 3GPP communication protocols (e.g., using a PC5 sidelink interface according to LTE, 5G, etc.), Wi-Fi direct communication protocols (e.g., DSRC protocol), or using any other device-to-device communication protocol.

In some aspects, a UE device may implement proactive or "on demand" transmission of a sidelink synchronization signal. In some cases, a UE device may transmit a sidelink synchronization signal prior to entering a geographic area (referred to herein as a shielded geographic area) that is associated with a degraded or deficient synchronization source signal, such as a deficient GNSS signal or deficient base station signal. In some examples, a shielded geographic area based on a deficient GNSS signal can include a tunnel, a parking garage, an urban canyon, a forest, and/or any other geographic area associated with a poor GNSS signal and/or a poor base station signal.

As noted above, in some cases, a UE device may identify a shielded geographic area based on signaling from a base station. For instance, a base station and/or location server can track the position of a UE device and determine when the UE device is near a shielded geographic area. In some cases, a base station can implement a geofence corresponding to the shielded geographic area. In some examples, a UE device can be configured to identify the shielded geographic area based on a UE sidelink configuration (e.g., locally configured geofence). In some cases, a UE device can be configured to identify the shielded geographic area using a machine learning algorithm.

In some examples, UE devices may proactively form a cluster (e.g., UE platoon) and select a UE device to function as the source of the sidelink synchronization signal. In some cases, the cluster or platoon can be formed before all of the UE devices in the cluster lose the GNSS signal (e.g., before entering a shielded geographic area). In some aspects, proactive formation of the UE platoon can be used to configure a UE device as the synchronization reference source while the UE device is still synchronized to the GNSS signal.

In some examples, the systems and techniques disclosed herein can be used to implement a UE platoon formation that allows multiple UE devices to use the reference signal from the platoon leader (e.g., sidelink synchronization signal source) and avoids the need for multiple UE devices to transmit the sidelink synchronization reference signal (e.g., reduces interference, reduces power consumption, reduces heat dissipation, etc.). In some aspects, the systems and techniques disclosed herein may improve the latency for implementing sidelink communications (e.g., UE devices do not need to lose GNSS signal to form cluster). In some examples, the systems and techniques disclosed herein may be implemented using application layer protocol. In some cases, the systems and techniques disclosed herein can be implemented without affecting layer 2 signaling.

Additional aspects of the present disclosure are described in more detail below.

As used herein, the term "communication unit" is a system, device, or component of a UE (e.g., a vehicle, a user device, etc.) and/or other device (e.g., a road side unit (RSU) or other device) that may include a telematics control unit (TCU), a network access device (NAD), a modem, a subscriber identity module (SIM), a transceiver (or individual receiver and/or transmitter), any combination thereof, and/or other system, device, or component configured to perform wireless communication operations.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, tracking device, wearable device (e.g., smart watch, glasses, an extended reality (XR) device such as a virtual reality (VR) headset, an augmented reality (AR) headset or glasses, or a mixed reality (MR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "user device," a "user terminal" or UT, a "client device," a "wireless device," a "wireless communication device," a "subscriber device," a "subscriber terminal," a "subscriber station," a "mobile device," a "mobile terminal," a "mobile station," or variations thereof. Generally, UEs may communicate with a core network via a RAN, and through the core network the UEs may be connected with external networks such as the Internet and with other UEs. UEs may also communicate with other UEs and/or other devices as described herein. In some cases, other mechanisms of connecting to the core network, the Internet, and other UEs are also possible for the UEs, such as over wired access networks, wireless local area network (WLAN) networks (e.g., based on IEEE 802.11, based on ultra-wideband (UWB), etc.), and so on.

A base station may operate according to one of several RATs in communication with UEs, RSUs, and/or other devices, depending on the network in which it is deployed. In some cases, a base station may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs may send signals to a base station is called an uplink (UL) channel (e.g., a reverse traffic channel, a reverse control channel, an access channel, etc.). A communication link through which the base station may send signals to UEs is called a downlink (DL) or forward link channel (e.g., a paging channel, a control channel, a broadcast channel, a forward traffic channel, etc.). As used herein the term traffic channel (TCH) may refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

A road side unit (RSU) is a device that may transmit and receive messages over a communications link or interface (e.g., a cellular-based sidelink or PC5 interface, an 802.11 or WiFi™ based Dedicated Short Range Communication (DSRC) interface, and/or other interface) to and from one or more UEs, other RSUs, and/or base stations. An example of messages that may be transmitted and received by an RSU includes vehicle-to-everything (V2X) messages, which are described in more detail below. RSUs may be located on various transportation infrastructure systems, including roads, bridges, parking lots, toll booths, and/or other infrastructure systems. In some examples, an RSU may facilitate communication between UEs (e.g., vehicles, pedestrian user devices, and/or other UEs) and the transportation infrastructure systems. In some implementations, a RSU may be in communication with a server, base station, and/or other system that may perform centralized management functions.

An RSU may communicate with a communications system of a UE. For example, an intelligent transport system (ITS) of a UE (e.g., a vehicle and/or other UE) may be used to generate and sign messages for transmission to an RSU and to validate messages received from an RSU. An RSU may communicate (e.g., over a PC5 interface, DSRC interface, etc.) with vehicles traveling along a road, bridge, or other infrastructure system in order to obtain traffic-related data (e.g., time, speed, location, etc. of the vehicle). In some cases, in response to obtaining the traffic-related data, the RSU may determine or estimate traffic congestion information (e.g., a start of traffic congestion, an end of traffic congestion, etc.), a travel time, and/or other information for a particular location. In some examples, the RSU may communicate with other RSUs (e.g., over a PC5 interface, DSRC interface, etc.) in order to determine the traffic-related data. The RSU may transmit the information (e.g., traffic congestion information, travel time information, and/or other information) to other vehicles, pedestrian UEs, and/or other UEs. For example, the RSU may broadcast or otherwise transmit the information to any UE (e.g., vehicle, pedestrian UE, etc.) that is in a coverage range of the RSU.

According to various aspects, FIG. 1 illustrates an example of a wireless communications system 100. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs and/or ng-eNBs where the wireless communications system 100 corresponds to a 4G/LTE network, or gNBs where the wireless communications system 100 corresponds to a 5G/NR network, or a combination of both, and the small cell base stations may include femtocells, picocells, microcells, etc.

The base stations 102 may collectively form a radio access network (RAN) and interface with a core network 170 (e.g., an evolved packet core (EPC) or a 5G core (5GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired and/or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency may be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available. In some examples, the wireless communications system 100 may include devices (e.g., UEs etc.) that communicate with one or more UEs 104, base stations 102, APs 150, etc. utilizing the ultra-wideband (UWB) spectrum. The UWB spectrum may range from 3.1 to 10.5 GHz.

The small cell base station 102' may operate in a licensed and/or an unlicensed frequency spectrum (e.g., utilizing LTE or NR technology and use the same 5 GHz unlicensed frequency spectrum as used by the WLAN AP 150). The wireless communications system 100 may further include a millimeter wave (mmW) base station 180 that may operate in mmW frequencies and/or near mmW frequencies in communication with a UE 182. In some cases, mmW frequencies may be referred to as the FR2 band (e.g., including a frequency range of 24250 MHz to 52600 MHz). In some examples, the wireless communications system 100 may include one or more base stations (referred to herein as "hybrid base stations") that operate in both the mmW frequencies (and/or near mmW frequencies) and in sub-6 GHz frequencies (referred to as the FR1 band, e.g., including a frequency range of 450 to 6000 MHz). In some examples, the mmW base station 180, one or more hybrid base stations (not shown), and the UE 182 may utilize beamforming (transmit and/or receive) over a mmW communication link 184 to compensate for the extremely high path loss and short range. The wireless communications system 100 may further include a UE 164 that may communicate with a macro cell base station 102 over a communication link 120 and/or the mmW base station 180 over a mmW communication link 184.

In some examples, in order to operate on multiple carrier frequencies, a base station 102 and/or a UE 104 may be equipped with multiple receivers and/or transmitters. For example, a UE 104 may have two receivers, "Receiver 1" and "Receiver 2," where "Receiver 1" is a multi-band receiver that may be tuned to band (i.e., carrier frequency) 'X' or band 'Y,' and "Receiver 2" is a one-band receiver tuneable to band 'Z' only.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, UWB, and so on.

Figure 2A:
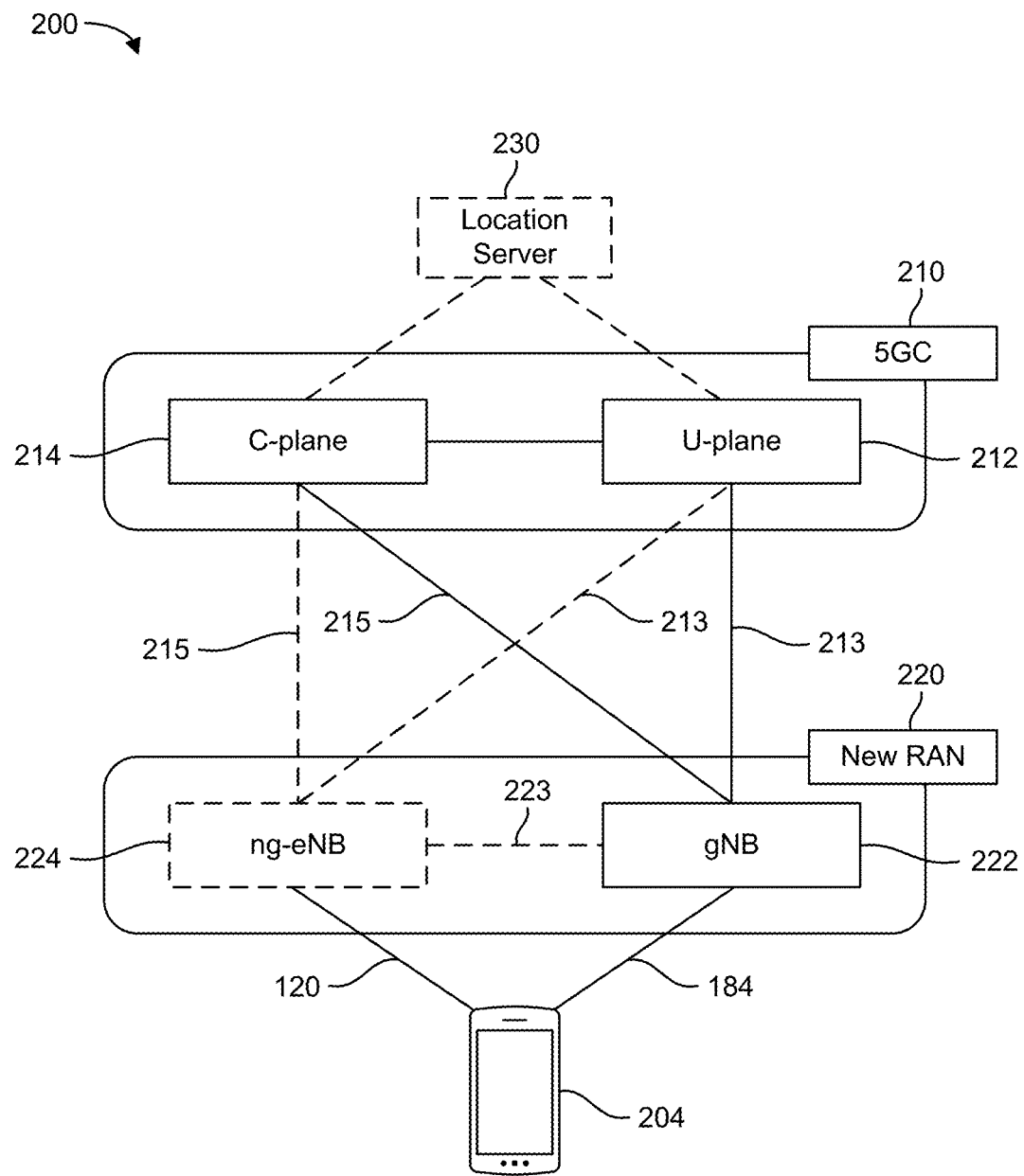
FIG. 2A and FIG. 2B illustrate examples of wireless network structures, according to aspects of the disclosure.

According to various aspects, FIG. 2A illustrates an example wireless network structure 200. For example, a 5GC 210 (also referred to as a Next Generation Core (NGC)) may be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the control plane functions 214 and user plane functions 212. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1).

In some aspects, wireless network structure 200 may include location server 230, which may be in communication with the 5GC 210 to provide location assistance for UEs 204. The location server 230 may be implemented as a plurality of separate servers (e.g., physically separate servers, different software modules on a single server, different software modules spread across multiple physical servers, etc.), or alternately may each correspond to a single server. The location server 230 may be configured to support one or more location services for UEs 204 that may connect to the location server 230 via the core network, 5GC 210, and/or via the Internet (not illustrated). Further, the location server 230 may be integrated into a component of the core network, or alternatively may be external to the core network. In some examples, the location server 230 may be operated by a carrier or provider of the 5GC 210, a third party, an original equipment manufacturer (OEM), or other party. In some cases, multiple location servers may be provided, such as a location server for the carrier, a location server for an OEM of a particular device, and/or other location servers. In such cases, location assistance data may be received from the location server of the carrier and other assistance data may be received from the location server of the OEM.

Figure 2B:
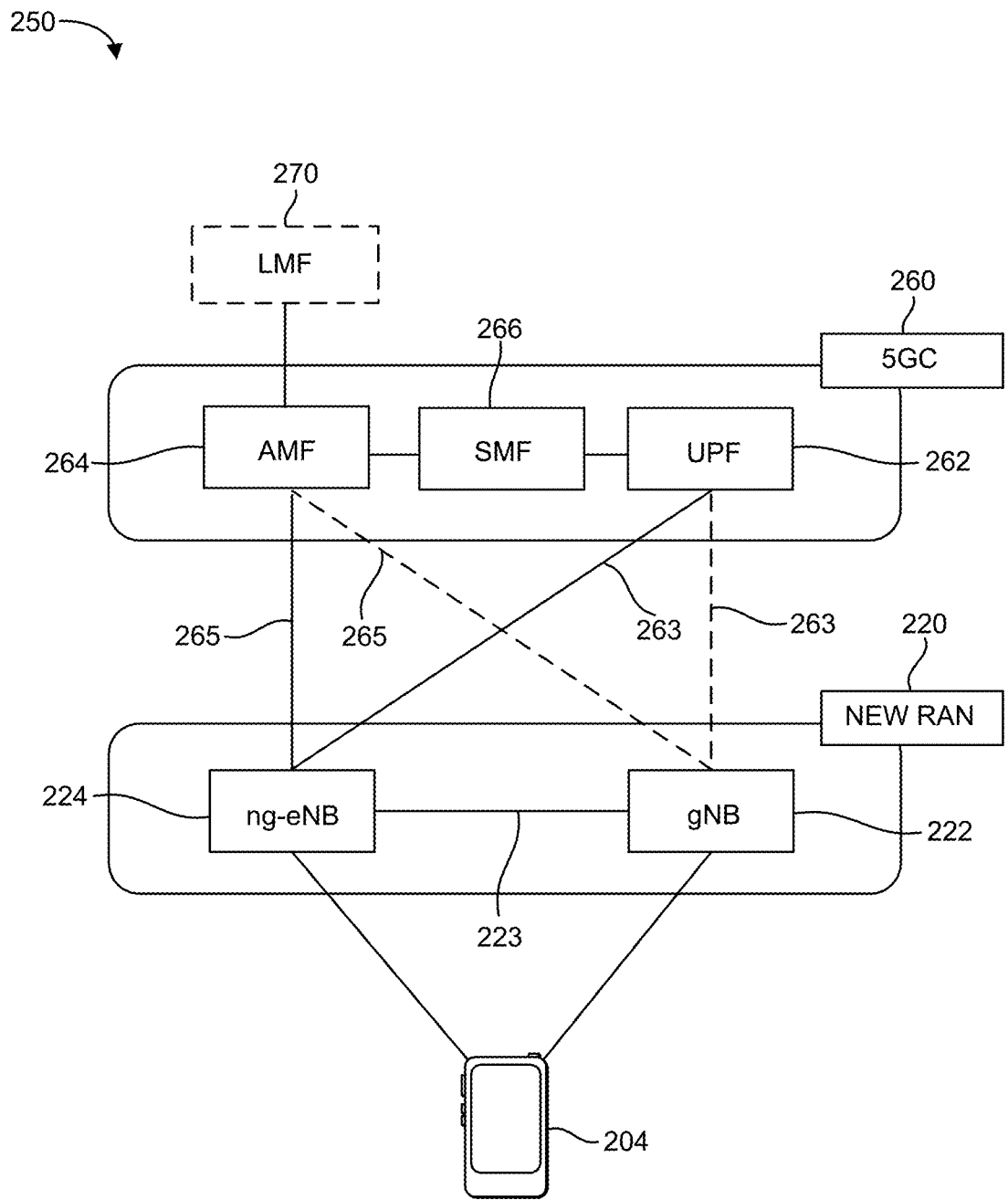

According to various aspects, FIG. 2B illustrates another example wireless network structure 250. In some examples, 5GC 260 may be viewed functionally as control plane functions, provided by an access and mobility management function (AMF) 264, and user plane functions, provided by a user plane function (UPF) 262, which operate cooperatively to form the core network (i.e., 5GC 260). User plane interface 263 and control plane interface 265 connect the ng-eNB 224 to the 5GC 260 and specifically to UPF 262 and AMF 264, respectively. In some examples, a gNB 222 may also be connected to the 5GC 260 via control plane interface 265 to AMF 264 and user plane interface 263 to UPF 262. Further, ng-eNB 224 may directly communicate with gNB 222 via the backhaul connection 223, with or without gNB direct connectivity to the 5GC 260. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). The base stations of the New RAN 220 communicate with the AMF 264 over the N2 interface and with the UPF 262 over the N3 interface.

The functions of the AMF 264 may include registration management, connection management, reachability management, mobility management, lawful interception, transport for session management (SM) messages between the UE 204 and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 may also interact with an authentication server function (AUSF) (not shown) and the UE 204, and may receive an intermediate key established as a result of the UE 204 authentication process.

In the case of authentication based on a UMTS (universal mobile telecommunications system) subscriber identity module (USIM), the AMF 264 may retrieve the security material from the AUSF. The functions of the AMF 264 may also include security context management (SCM). The SCM may receive a key from the SEAF that it may use to derive access-network specific keys. The functionality of the AMF 264 may also include location services management for regulatory services, transport for location services messages between the UE 204 and a location management function (LMF) 270 (which acts as a location server 230), transport for location services messages between the New RAN 220 and the LMF 270, evolved packet system (EPS) bearer identifier allocation for interworking with the EPS, and UE 204 mobility event notification. In addition, the AMF 264 may also support functionalities for non-3GPP access networks.

In some cases, UPF 262 may perform functions that include serving as an anchor point for intra/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink and/or downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. In some aspects, UPF 262 may also support transfer of location services messages over a user plane between the UE 204 and a location server, such as a secure user plane location (SUPL) location platform (SLP), not shown in FIG. 2B.

In some examples, the functions of SMF 266 may include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 may be referred to as the N11 interface.

In some aspects, wireless network structure 250 may include an LMF 270, which may be in communication with the 5GC 260 to provide location assistance for UEs 204. The LMF 270 may be implemented as a plurality of separate servers (e.g., physically separate servers, different software modules on a single server, different software modules spread across multiple physical servers, etc.), or alternately may each correspond to a single server. The LMF 270 may be configured to support one or more location services for UEs 204 that may connect to the LMF 270 via the core network, 5GC 260, and/or via the Internet (not illustrated). The SLP may support similar functions to the LMF 270, but whereas the LMF 270 may communicate with the AMF 264, New RAN 220, and UEs 204 over a control plane (e.g., using interfaces and protocols intended to convey signaling messages and not voice or data), the SLP may communicate with UEs 204 and external clients (not shown in FIG. 2B) over a user plane (e.g., using protocols intended to carry voice and/or data like the transmission control protocol (TCP) and/or IP).

In some cases, LMF 270 and/or the SLP may be integrated with a base station, such as the gNB 222 and/or the ng-eNB 224. When integrated with the gNB 222 and/or the ng-eNB 224, the LMF 270 and/or the SLP may be referred to as a "location management component," or "LMC." As used herein, references to LMF 270 and SLP include both the case in which the LMF 270 and the SLP are components of the core network (e.g., 5GC 260) and the case in which the LMF 270 and the SLP are components of a base station.

As described above, wireless communications systems support communication among multiple UEs. In various examples, wireless communications systems may be configured to support device-to-device (D2D) communication and/or vehicle-to-everything (V2X) communication. V2X may also be referred to as Cellular V2X (C-V2X). V2X communications may be performed using any radio access technology, such as LTE, 5G, WLAN, or other communication protocol. In some examples, UEs may transmit and receive V2X messages to and from other UEs, road side units (RSUs), and/or other devices over a direct communications link or interface (e.g., a PC5 or sidelink interface, an 802.11p DSRC interface, and/or other communications interface) and/or via the network (e.g., an eNB, a WiFi AP, and/or other network entity). The communications may be performed using resources assigned by the network (e.g., an eNB or other network device), resources pre-configured for V2X use, and/or using resources determined by the UEs (e.g., using clear channel assessment (CCA) with respect to resources of an 802.11 network).

V2X communications may include communications between vehicles (e.g., vehicle-to-vehicle (V2V)), communications between vehicles and infrastructure (e.g., vehicle-to-infrastructure (V2I)), communications between vehicles and pedestrians (e.g., vehicle-to-pedestrian (V2P)), and/or communications between vehicles and network servers (vehicle-to-network (V2N)). For V2V, V2P, and V2I communications, data packets may be sent directly (e.g., using a PC5 interface, using an 802.11 DSRC interface, etc.) between vehicles without going through the network, eNB, or gNB. V2X-enabled vehicles, for instance, may use a short-range direct-communication mode that provides 360° non line-of-sight (NLOS) awareness, complementing onboard line-of-sight (LOS) sensors, such as cameras, radio detection and ranging (RADAR), Light Detection and Ranging (LIDAR), among other sensors. The combination of wireless technology and onboard sensors enables V2X vehicles to visually observe, hear, and/or anticipate potential driving hazards (e.g., at blind intersections, in poor weather conditions, and/or in other scenarios). V2X vehicles may also understand alerts or notifications from other V2X-enabled vehicles (based on V2V communications), from infrastructure systems (based on V2I communications), and from user devices (based on V2P communications). Infrastructure systems may include roads, stop lights, road signs, bridges, toll booths, and/or other infrastructure systems that may communicate with vehicles using V2I messaging.

Depending on the desired implementation, sidelink communications may be performed according to 3GPP communication protocols sidelink (e.g., using a PC5 sidelink interface according to LTE, 5G, etc.), Wi-Fi direct communication protocols (e.g., DSRC protocol), or using any other device-to-device communication protocol. In some examples, sidelink communication may be performed using one or more Unlicensed National Information Infrastructure (U-NII) bands. For instance, sidelink communications may be performed in bands corresponding to the U-NII-4 band (5.850-5.925 GHz), the U-NII-5 band (5.925-6.425 GHz), the U-NII-6 band (6.425-6.525 GHz), the U-NII-7 band (6.525-6.875 GHz), the U-NII-8 band (6.875-7.125 GHz), or any other frequency band that may be suitable for performing sidelink communications.

Figure 3:
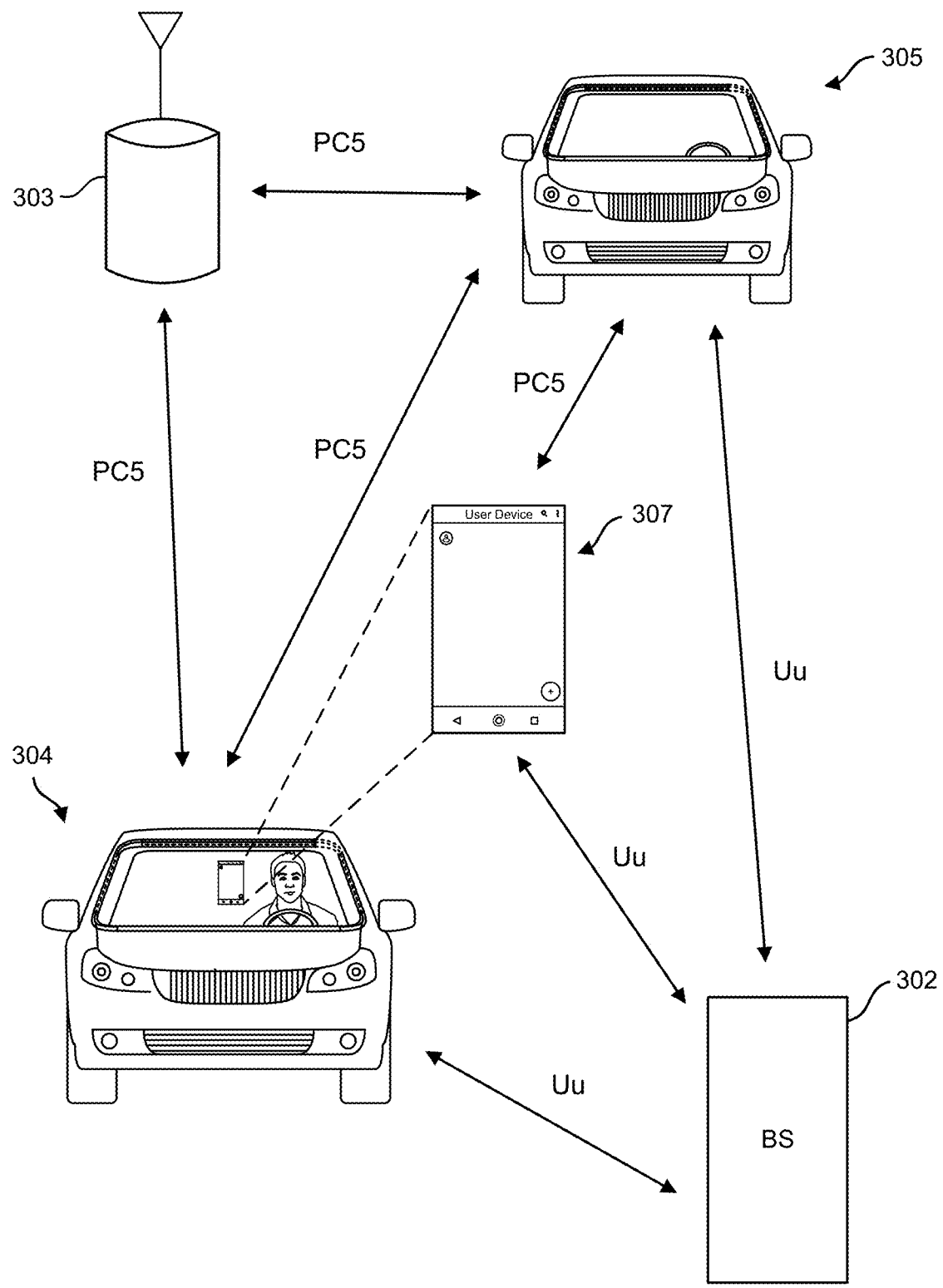
FIG. 3 is a diagram illustrating an example of various user equipment (UEs) communicating over direct communication interfaces (referred to as a PC5 interface or a sidelink interface) and wide area network (Uu) interfaces, according to aspects of the disclosure.

FIG. 3 illustrates examples of different communication mechanisms used by various UEs. In one example, FIG. 3 illustrates a vehicle 304, a vehicle 305, and a roadside unit (RSU) 303 that may communicate with each other using PC5 signaling interfaces. In addition, the vehicle 304 and the vehicle 305 may communicate with a base station 302 (shown as BS 302) using a network (Uu) interface. In some examples, the base station 302 may include a gNB (e.g., base stations 102). FIG. 3 also illustrates a user device 307 communicating with the base station 302 using a network (Uu) interface. In some aspects, functionalities may be transferred from a vehicle (e.g., vehicle 304) to a user device (e.g., user device 307) based on one or more characteristics or factors (e.g., temperature, humidity, etc.). In one illustrative example, V2X functionality may be transitioned from the vehicle 304 to the user device 307, after which the user device 307 may communicate with other vehicles (e.g., vehicle 305) over a PC5 interface, as shown in FIG. 3.

While PC5 interfaces are shown in FIG. 3, the various UEs (e.g., vehicles, user devices, etc.) and RSU(s) may communicate directly using any suitable type of direct interface, such as an 802.11 DSRC interface, a Bluetooth™ interface, and/or other interface. For example, a vehicle may communicate with a user device over a direct communications interface (e.g., using PC5 and/or DSRC), a vehicle may communicate with another vehicle over the direct communications interface, a user device may communicate with another user device over the direct communications interface, a UE (e.g., a vehicle, user device, etc.) may communicate with an RSU over the direct communications interface, an RSU may communicate with another RSU over the direct communications interface, and the like.

Figure 4:
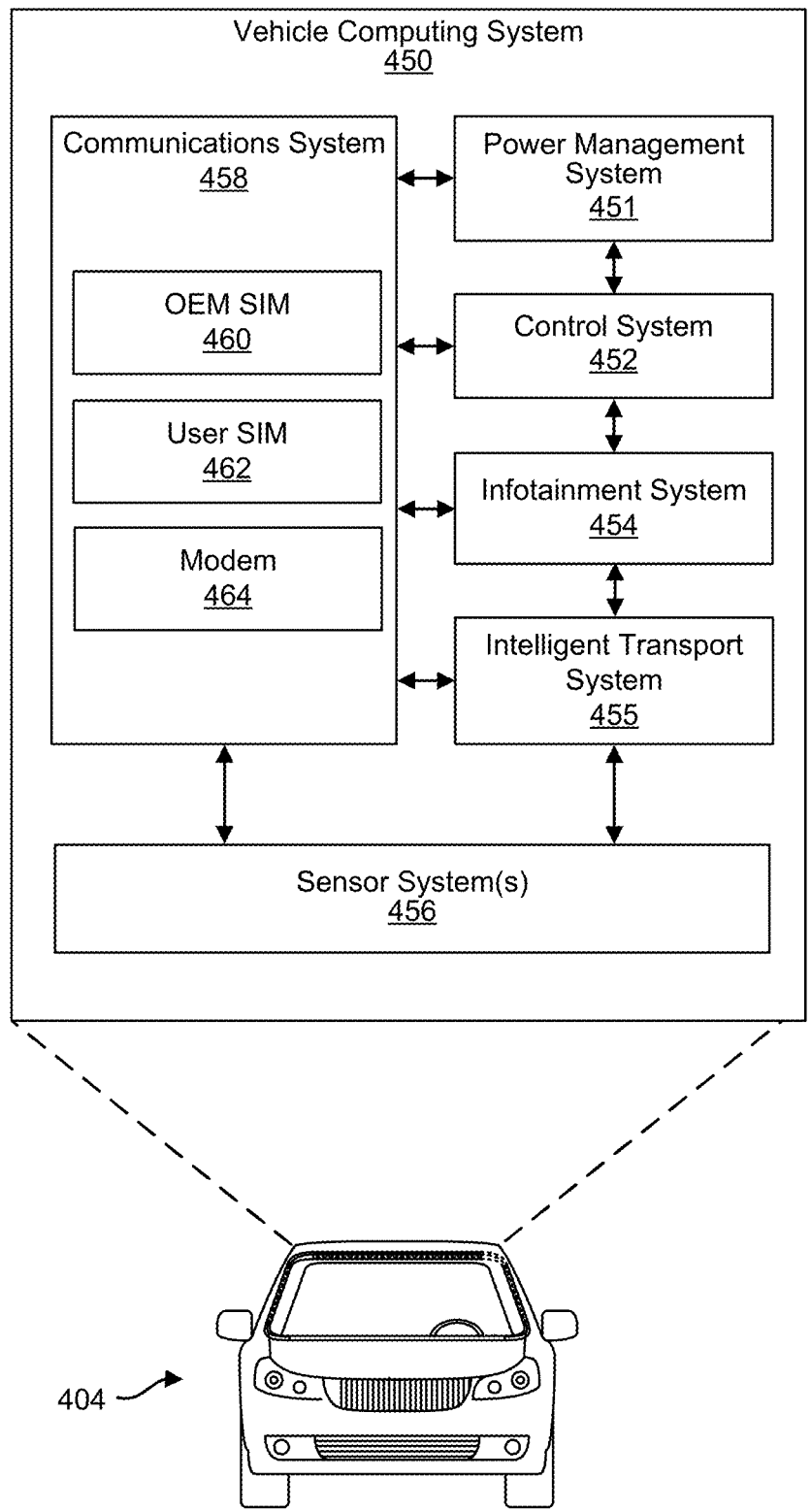
FIG. 4 is a block diagram illustrating an example of a computing system of a vehicle, according to aspects of the disclosure.

FIG. 4 is a block diagram illustrating an example vehicle computing system 450 of a vehicle 404. In some examples, the vehicle computing system 450 may be referred to as an on-board unit (OBU). The vehicle 404 is an example of a UE that may communicate with a network (e.g., an eNB, a gNB, a positioning beacon, a location measurement unit, and/or other network entity) over a Uu interface and with other UEs using V2X communications over a PC5 interface (or other device to device direct interface). As shown, the vehicle computing system 450 may include at least a power management system 451, a control system 452, an infotainment system 454, an intelligent transport system (ITS) 455, one or more sensor systems 456, and a communications system 458. In some cases, the vehicle computing system 450 may include or may be implemented using any type of processing device or system, such as one or more central processing units (CPUs), digital signal processors (DSPs), application specific integrated circuits (ASICs), field programmable gate arrays (FPGAs), application processors (APs), graphics processing units (GPUs), vision processing units (VPUs), Neural Network Signal Processors (NSPs), microcontrollers, dedicated hardware, any combination thereof, and/or other processing device or system.

The control system 452 may be configured to control one or more operations of the vehicle 404, the power management system 451, the computing system 450, the infotainment system 454, the ITS 455, and/or one or more other systems of the vehicle 404 (e.g., a braking system, a steering system, a safety system other than the ITS 455, a cabin system, and/or other system). In some examples, the control system 452 may include one or more electronic control units (ECUs). An ECU may control one or more of the electrical systems or subsystems in a vehicle. Examples of specific ECUs that may be included as part of the control system 452 include an engine control module (ECM), a powertrain control module (PCM), a transmission control module (TCM), a brake control module (BCM), a central control module (CCM), a central timing module (CTM), among others. In some cases, the control system 452 may receive sensor signals from the one or more sensor systems 456 and may communicate with other systems of the vehicle computing system 450 to operate the vehicle 404.

The vehicle computing system 450 also includes a power management system 451. In some implementations, the power management system 451 may include a power management integrated circuit (PMIC), a standby battery, and/or other components. In some cases, other systems of the vehicle computing system 450 may include one or more PMICs, batteries, and/or other components. The power management system 451 may perform power management functions for the vehicle 404, such as managing a power supply for the computing system 450 and/or other parts of the vehicle. For example, the power management system 451 may provide a stable power supply in view of power fluctuations, such as based on starting an engine of the vehicle. In another example, the power management system 451 may perform thermal monitoring operations, such as by checking ambient and/or transistor junction temperatures. In another example, the power management system 451 may perform certain functions based on detecting a certain temperature level, such as causing a cooling system (e.g., one or more fans, an air conditioning system, etc.) to cool certain components of the vehicle computing system 450 (e.g., the control system 452, such as one or more ECUs), shutting down certain functionalities of the vehicle computing system 450 (e.g., limiting the infotainment system 454, such as by shutting off one or more displays, disconnecting from a wireless network, etc.), among other functions.

The vehicle computing system 450 further includes a communications system 458. The communications system 458 may include both software and hardware components for transmitting signals to and receiving signals from a network (e.g., a gNB or other network entity over a Uu interface) and/or from other UEs (e.g., to another vehicle or UE over a PC5 interface, WiFi interface, Bluetooth™ interface, and/or other wireless and/or wired interface). For example, the communications system 458 is configured to transmit and receive information wirelessly over any suitable wireless network (e.g., a 3G network, 4G network, 5G network, WiFi network, Bluetooth™ network, and/or other network). The communications system 458 includes various components or devices used to perform the wireless communication functionalities, including an original equipment manufacturer (OEM) subscriber identity module (referred to as a SIM or SIM card) 460, a user SIM 462, and a modem 464. While the vehicle computing system 450 is shown as having two SIMs and one modem, the computing system 450 may have any number of SIMs (e.g., one SIM or more than two SIMs) and any number of modems (e.g., one modem, two modems, or more than two modems) in some implementations.

A SIM is a device (e.g., an integrated circuit) that may securely store an international mobile subscriber identity (IMSI) number and a related key (e.g., an encryption-decryption key) of a particular subscriber or user. The IMSI and key may be used to identify and authenticate the subscriber on a particular UE. The OEM SIM 460 may be used by the communications system 458 for establishing a wireless connection for vehicle-based operations, such as for conducting emergency-calling (eCall) functions, communicating with a communications system of the vehicle manufacturer (e.g., for software updates, etc.), among other operations. The OEM SIM 460 may be used to support one or more services such as eCall for making emergency calls in the event of a car accident or other emergency. For instance, eCall may include a service that automatically dials an emergency number (e.g., "9-1-1" in the United States, "1-1-2" in Europe, etc.) in the event of a vehicle accident and communicates a location of the vehicle to the emergency services, such as a police department, fire department, etc.

The user SIM 462 may be used by the communications system 458 for performing wireless network access functions in order to support a user data connection (e.g., for conducting phone calls, messaging, Infotainment related services, among others). In some cases, a user device of a user may connect with the vehicle computing system 450 over an interface (e.g., over PCS, Bluetooth™, WiFi™, a universal serial bus (USB) port, and/or other wireless or wired interface). Once connected, the user device may transfer wireless network access functionality from the user device to communications system 458 the vehicle, in which case the user device may cease performance of the wireless network access functionality (e.g., during the period in which the communications system 458 is performing the wireless access functionality). The communications system 458 may begin interacting with a base station to perform one or more wireless communication operations, such as facilitating a phone call, transmitting and/or receiving data (e.g., messaging, video, audio, etc.), among other operations. In such cases, other components of the vehicle computing system 450 may be used to output data received by the communications system 458. For example, the infotainment system 454 (described below) may display video received by the communications system 458 on one or more displays and/or may output audio received by the communications system 458 using one or more speakers.

A modem is a device that modulates one or more carrier wave signals to encode digital information for transmission, and demodulates signals to decode the transmitted information. The modem 464 (and/or one or more other modems of the communications system 458) may be used for communication of data for the OEM SIM 460 and/or the user SIM 462. In some examples, the modem 464 may include a 4G (or LTE) modem and another modem (not shown) of the communications system 458 may include a 5G (or NR) modem. In some examples, the communications system 458 may include one or more Bluetooth™ modems (e.g., for Bluetooth™ Low Energy (BLE) or other type of Bluetooth communications), one or more WiFi™ modems (e.g., for DSRC communications and/or other WiFi communications), wideband modems (e.g., an ultra-wideband (UWB) modem), any combination thereof, and/or other types of modems.

In some cases, the modem 464 (and/or one or more other modems of the communications system 458) may be used for performing V2X communications (e.g., with other vehicles for V2V communications, with other devices for D2D communications, with infrastructure systems for V2I communications, with pedestrian UEs for V2P communications, etc.). In some examples, the communications system 458 may include a V2X modem used for performing V2X communications (e.g., sidelink communications over a PC5 interface), in which case the V2X modem may be separate from one or more modems used for wireless network access functions (e.g., for network communications over a network/Uu interface and/or sidelink communications other than V2X communications).

In some examples, the communications system 458 may be or may include a telematics control unit (TCU). In some implementations, the TCU may include a network access device (NAD) (also referred to in some cases as a network control unit or NCU). The NAD may include the modem 464, any other modem not shown in FIG. 4, the OEM SIM 460, the user SIM 462, and/or other components used for wireless communications. In some examples, the communications system 458 may include a Global Navigation Satellite System (GNSS). In some cases, the GNSS may be part of the one or more sensor systems 456, as described below. The GNSS may provide the ability for the vehicle computing system 450 to perform one or more location services, navigation services, and/or other services that may utilize GNSS functionality.

In some cases, the communications system 458 may further include one or more wireless interfaces (e.g., including one or more transceivers and one or more baseband processors for each wireless interface) for transmitting and receiving wireless communications, one or more wired interfaces (e.g., a serial interface such as a universal serial bus (USB) input, a lightening connector, and/or other wired interface) for performing communications over one or more hardwired connections, and/or other components that may allow the vehicle 404 to communicate with a network and/or other UEs.

The vehicle computing system 450 may also include an infotainment system 454 that may control content and one or more output devices of the vehicle 404 that may be used to output the content. The infotainment system 454 may also be referred to as an in-vehicle infotainment (IVI) system or an In-car entertainment (ICE) system. The content may include navigation content, media content (e.g., video content, music or other audio content, and/or other media content), among other content. The one or more output devices may include one or more graphical user interfaces, one or more displays, one or more speakers, one or more extended reality devices (e.g., a VR, AR, and/or MR headset), one or more haptic feedback devices (e.g., one or more devices configured to vibrate a seat, steering wheel, and/or other part of the vehicle 404), and/or other output device.

In some examples, the computing system 450 may include the intelligent transport system (ITS) 455. In some examples, the ITS 455 may be used for implementing V2X communications. For example, an ITS stack of the ITS 455 may generate V2X messages based on information from an application layer of the ITS. In some cases, the application layer may determine whether certain conditions have been met for generating messages for use by the ITS 455 and/or for generating messages that are to be sent to other vehicles (for V2V communications), to pedestrian UEs (for V2P communications), and/or to infrastructure systems (for V2I communications). In some cases, the communications system 458 and/or the ITS 455 may obtain car access network (CAN) information (e.g., from other components of the vehicle via a CAN bus). In some examples, the communications system 458 (e.g., a TCU NAD) may obtain the CAN information via the CAN bus and may send the CAN information to the ITS stack. The CAN information may include vehicle related information, such as a heading of the vehicle, speed of the vehicle, breaking information, among other information. The CAN information may be continuously or periodically (e.g., every 1 millisecond (ms), every 10 ms, or the like) provided to the ITS 455.

The conditions used to determine whether to generate messages may be determined using the CAN information based on safety-related applications and/or other applications, including applications related to road safety, traffic efficiency, infotainment, business, and/or other applications. In one illustrative example, ITS 455 may perform lane change assistance or negotiation. For instance, using the CAN information, the ITS 455 may determine that a driver of the vehicle 404 is attempting to change lanes from a current lane to an adjacent lane (e.g., based on a blinker being activated, based on the user veering or steering into an adjacent lane, etc.). Based on determining the vehicle 404 is attempting to change lanes, the ITS 455 may determine a lane-change condition has been met that is associated with a message to be sent to other vehicles that are nearby the vehicle in the adjacent lane. The ITS 455 may trigger the ITS stack to generate one or more messages for transmission to the other vehicles, which may be used to negotiate a lane change with the other vehicles. Other examples of applications include forward collision warning, automatic emergency breaking, lane departure warning, pedestrian avoidance or protection (e.g., when a pedestrian is detected near the vehicle 404, such as based on V2P communications with a UE of the user), traffic sign recognition, among others.

The ITS 455 may use any suitable protocol to generate messages (e.g., V2X messages). Examples of protocols that may be used by the ITS 455 include one or more Society of Automotive Engineering (SAE) standards, such as SAE J2735, SAE J2945, SAE J3161, and/or other standards, which are hereby incorporated by reference in their entirety and for all purposes.

A security layer of the ITS 455 may be used to securely sign messages from the ITS stack that are sent to and verified by other UEs configured for V2X communications, such as other vehicles, pedestrian UEs, and/or infrastructure systems. The security layer may also verify messages received from such other UEs. In some implementations, the signing and verification processes may be based on a security context of the vehicle. In some examples, the security context may include one or more encryption-decryption algorithms, a public and/or private key used to generate a signature using an encryption-decryption algorithm, and/or other information. For example, each ITS message generated by the ITS stack may be signed by the security layer. The signature may be derived using a public key and an encryption-decryption algorithm. A vehicle, pedestrian UE, and/or infrastructure system receiving a signed message may verify the signature to make sure the message is from an authorized vehicle. In some examples, the one or more encryption-decryption algorithms may include one or more symmetric encryption algorithms (e.g., advanced encryption standard (AES), data encryption standard (DES), and/or other symmetric encryption algorithm), one or more asymmetric encryption algorithms using public and private keys (e.g., Rivest-Shamir-Adleman (RSA) and/or other asymmetric encryption algorithm), and/or other encryption-decryption algorithm.

In some examples, the ITS 455 may determine certain operations (e.g., V2X-based operations) to perform based on messages received from other UEs. The operations may include safety-related and/or other operations, such as operations for road safety, traffic efficiency, infotainment, business, and/or other applications. In some examples, the operations may include causing the vehicle (e.g., the control system 452) to perform automatic functions, such as automatic breaking, automatic steering (e.g., to maintain a heading in a particular lane), automatic lane change negotiation with other vehicles, among other automatic functions. In one illustrative example, a message may be received by the communications system 458 from another vehicle (e.g., over a PC5 interface) indicating that the other vehicle is coming to a sudden stop. In response to receiving the message, the ITS 455 may generate a message or instruction and may send the message or instruction to the control system 452, which may cause the control system 452 to automatically break the vehicle 404 so that it comes to a stop before making impact with the other vehicle. In other illustrative examples, the operations may include triggering display of a message alerting a driver that another vehicle is in the lane next to the vehicle, a message alerting the driver to stop the vehicle, a message alerting the driver that a pedestrian is in an upcoming cross-walk, a message alerting the driver that a toll booth is within a certain distance (e.g., within 1 mile) of the vehicle, among others.

The computing system 450 further includes one or more sensor systems 456 (e.g., a first sensor system through an Nth sensor system, where N is a value equal to or greater than 0). When including multiple sensor systems, the sensor system(s) 456 may include different types of sensor systems that may be arranged on or in different parts the vehicle 404. The sensor system(s) 456 may include one or more camera sensor systems, Light Detection and Ranging (LIDAR) sensor systems, radio detection and ranging (RADAR) sensor systems, Electromagnetic Detection and Ranging (EmDAR) sensor systems, Sound Navigation and Ranging (SONAR) sensor systems, Sound Detection and Ranging (SODAR) sensor systems, Global Navigation Satellite System (GNSS) receiver systems (e.g., one or more Global Positioning System (GPS) receiver systems), accelerometers, gyroscopes, inertial measurement units (IMUs), infrared sensor systems, laser rangefinder systems, ultrasonic sensor systems, infrasonic sensor systems, microphones, any combination thereof, and/or other sensor systems. It should be understood that any number of sensors or sensor systems may be included as part of the computing system 450 of the vehicle 404.

While the vehicle computing system 450 is shown to include certain components and/or systems, one of ordinary skill will appreciate that the vehicle computing system 450 may include more or fewer components than those shown in FIG. 4. For example, the vehicle computing system 450 may also include one or more input devices and one or more output devices (not shown). In some implementations, the vehicle computing system 450 may also include (e.g., as part of or separate from the control system 452, the infotainment system 454, the communications system 458, and/or the sensor system(s) 456) at least one processor and at least one memory having computer-executable instructions that are executed by the at least one processor. The at least one processor is in communication with and/or electrically connected to (referred to as being "coupled to" or "communicatively coupled") the at least one memory. The at least one processor may include, for example, one or more microcontrollers, one or more central processing units (CPUs), one or more field programmable gate arrays (FPGAs), one or more graphics processing units (GPUs), one or more application processors (e.g., for running or executing one or more software applications), and/or other processors. The at least one memory may include, for example, read-only memory (ROM), random access memory (RAM) (e.g., static RAM (SRAM)), electrically erasable programmable read-only memory (EEPROM), flash memory, one or more buffers, one or more databases, and/or other memory. The computer-executable instructions stored in or on the at least memory may be executed to perform one or more of the functions or operations described herein.

Figure 5:
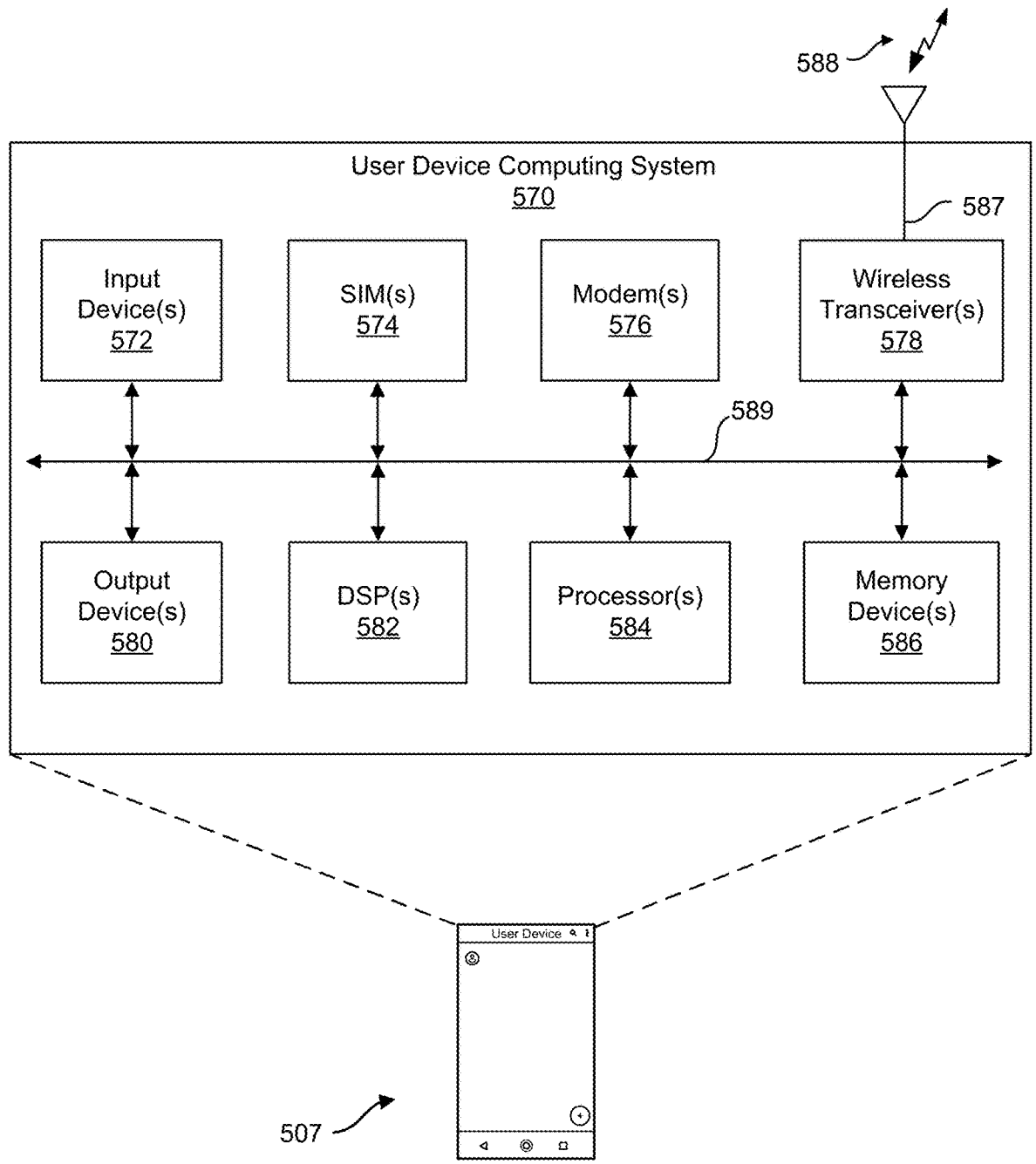
FIG. 5 is a block diagram illustrating an example of a computing system of a user device, according to aspects of the disclosure.

FIG. 5 illustrates an example of a computing system 570 of a wireless device 507. The wireless device 507 may include a client device such as a UE (e.g., UE 104, UE 152, UE 190) or other type of device (e.g., a station (STA)

configured to communication using a Wi-Fi interface) that may be used by an end-user. Wireless device may also include network devices (e.g., base stations such as eNBs and/or gNBs, Wi-Fi access points (APs) such as routers, range extenders or the like, etc.). For example, the wireless device 507 may include a mobile phone, router, tablet computer, laptop computer, tracking device, wearable device (e.g., a smart watch, glasses, an extended reality (XR) device such as a virtual reality (VR), augmented reality (AR) or mixed reality (MR) device, etc.), Internet of Things (IoT) device, base station, access point, vehicle (e.g., vehicle 404), and/or another device that is configured to communicate over a wireless communications network. The computing system 570 includes software and hardware components that may be electrically or communicatively coupled via a bus 589 (or may otherwise be in communication, as appropriate). For example, the computing system 570 includes one or more processors 584. The one or more processors 584 may include one or more CPUs, ASICs, FPGAs, APs, GPUs, VPUs, NSPs, microcontrollers, dedicated hardware, any combination thereof, and/or other processing device or system. The bus 589 may be used by the one or more processors 584 to communicate between cores and/or with the one or more memory devices 586.

The computing system 570 may also include one or more memory devices 586, one or more digital signal processors (DSPs) 582, one or more SIMs 574, one or more modems 576, one or more wireless transceivers 578, an antenna 587, one or more input devices 572 (e.g., a camera, a mouse, a keyboard, a touch sensitive screen, a touch pad, a keypad, a microphone, and/or the like), and one or more output devices 580 (e.g., a display, a speaker, a printer, and/or the like).

In some aspects, computing system 570 may include one or more radio frequency (RF) interfaces configured to transmit and/or receive RF signals. In some examples, an RF interface may include components such as modem(s) 576, wireless transceiver(s) 578, and/or antennas 587. The one or more wireless transceivers 578 may transmit and receive wireless signals (e.g., signal 588) via antenna 587 from one or more other devices, such as other wireless devices, network devices (e.g., base stations such as eNBs and/or gNBs, Wi-Fi access points (APs) such as routers, range extenders or the like, etc.), cloud networks, and/or the like. In some examples, the computing system 570 may include multiple antennas or an antenna array that may facilitate simultaneous transmit and receive functionality. Antenna 587 may be an omnidirectional antenna such that radio frequency (RF) signals may be received from and transmitted in all directions. The wireless signal 588 may be transmitted via a wireless network. The wireless network may be any wireless network, such as a cellular or telecommunications network (e.g., 3G, 4G, 5G, etc.), wireless local area network (e.g., a Wi-Fi network), a Bluetooth™ network, and/or other network.

In some examples, the wireless signal 588 may be transmitted directly to other wireless devices using sidelink communications (e.g., using a PC5 interface, using a DSRC interface, etc.). Wireless transceivers 578 may be configured to transmit RF signals for performing sidelink communications via antenna 587 in accordance with one or more transmit power parameters that may be associated with one or more regulation modes. Wireless transceivers 578 may also be configured to receive sidelink communication signals having different signal parameters from other wireless devices.

In some examples, the one or more wireless transceivers 578 may include an RF front end including one or more components, such as an amplifier, a mixer (also referred to as a signal multiplier) for signal down conversion, a frequency synthesizer (also referred to as an oscillator) that provides signals to the mixer, a baseband filter, an analog-to-digital converter (ADC), one or more power amplifiers, among other components. The RF front-end may generally handle selection and conversion of the wireless signals 588 into a baseband or intermediate frequency and may convert the RF signals to the digital domain.

In some cases, the computing system 570 may include a coding-decoding device (or CODEC) configured to encode and/or decode data transmitted and/or received using the one or more wireless transceivers 578. In some cases, the computing system 570 may include an encryption-decryption device or component configured to encrypt and/or decrypt data (e.g., according to the AES and/or DES standard) transmitted and/or received by the one or more wireless transceivers 578.

The one or more SIMs 574 may each securely store an international mobile subscriber identity (IMSI) number and related key assigned to the user of the wireless device 507. The IMSI and key may be used to identify and authenticate the subscriber when accessing a network provided by a network service provider or operator associated with the one or more SIMs 574. The one or more modems 576 may modulate one or more signals to encode information for transmission using the one or more wireless transceivers 578. The one or more modems 576 may also demodulate signals received by the one or more wireless transceivers 578 in order to decode the transmitted information. In some examples, the one or more modems 576 may include a Wi-Fi modem, a 4G (or LTE) modem, a 5G (or NR) modem, and/or other types of modems. The one or more modems 576 and the one or more wireless transceivers 578 may be used for communicating data for the one or more SIMs 574.

The computing system 570 may also include (and/or be in communication with) one or more non-transitory machine-readable storage media or storage devices (e.g., one or more memory devices 586), which may include, without limitation, local and/or network accessible storage, a disk drive, a drive array, an optical storage device, a solid-state storage device such as a RAM and/or a ROM, which may be programmable, flash-updateable and/or the like. Such storage devices may be configured to implement any appropriate data storage, including without limitation, various file systems, database structures, and/or the like.

In various embodiments, functions may be stored as one or more computer-program products (e.g., instructions or code) in memory device(s) 586 and executed by the one or more processor(s) 584 and/or the one or more DSPs 582. The computing system 570 may also include software elements (e.g., located within the one or more memory devices 586), including, for example, an operating system, device drivers, executable libraries, and/or other code, such as one or more application programs, which may comprise computer programs implementing the functions provided by various embodiments, and/or may be designed to implement methods and/or configure systems, as described herein.

In some aspects, the wireless device 507 may include means for performing operations described herein. The means may include one or more of the components of the computing system 570. For example, the means for performing operations described herein may include one or more of input device(s) 572, SIM(s) 574, modems(s) 576, wireless transceiver(s) 578, output device(s) (580), DSP(s) 582, processors (584), memory device(s) 586, and/or antenna(s) 587.

In some aspects, wireless device 507 may correspond to a user equipment (UE) device and may include: means for determining that a prospective position of a user equipment (UE) device is in a geographic area associated with a deficient global navigation satellite system (GNSS) signal and a deficient base station signal; and means for transmitting a sidelink synchronization signal to at least one other UE device that is located within the geographic area associated with the deficient GNSS signal and the deficient base station signal. In some examples, the means for determining may include the one or more processors 584, the one or more DSPs 582, the one or more wireless transceivers 578, the one or more modems 576, the one or more memory devices 586, any combination thereof, or other component(s) of the wireless device. In some aspects, the means for transmitting can include the one or more wireless transceivers 578, the one or more modems 576, the one or more SIMs 574, the one or more processors 584, the one or more DSPs 582, the one or more memory devices 586, any combination thereof, or other component(s) of the wireless device.

In some examples, wireless device 507 may correspond to a user equipment (UE) device and may include: means for receiving, by a user equipment (UE) device, a request to associate with at least one other UE device to form a UE platoon; means for identifying the UE device as a sidelink synchronization source for the UE platoon based on a position of the UE device relative to the at least one other UE device; and means for transmitting a first sidelink synchronization signal while at least a portion of the UE platoon is in a geographic area associated with a deficient global navigation satellite system (GNSS) signal and a deficient base station signal. In some examples, the means for receiving may include the one or more wireless transceivers 578, the one or more modems 576, the one or more SIMs 574, the one or more processors 584, the one or more DSPs 582, the one or more memory devices 586, any combination thereof, or other component(s) of the wireless device. In some aspects, the means for identifying may include the one or more processors 584, the one or more DSPs 582, the one or more wireless transceivers 578, the one or more modems 576, the one or more memory devices 586, any combination thereof, or other component(s) of the wireless device. In some cases, the means for transmitting may include the one or more wireless transceivers 578, the one or more modems 576, the one or more SINN 574, the one or more processors 584, the one or more DSPs 582, the one or more memory devices 586, any combination thereof, or other component(s) of the wireless device.

Figure 6:
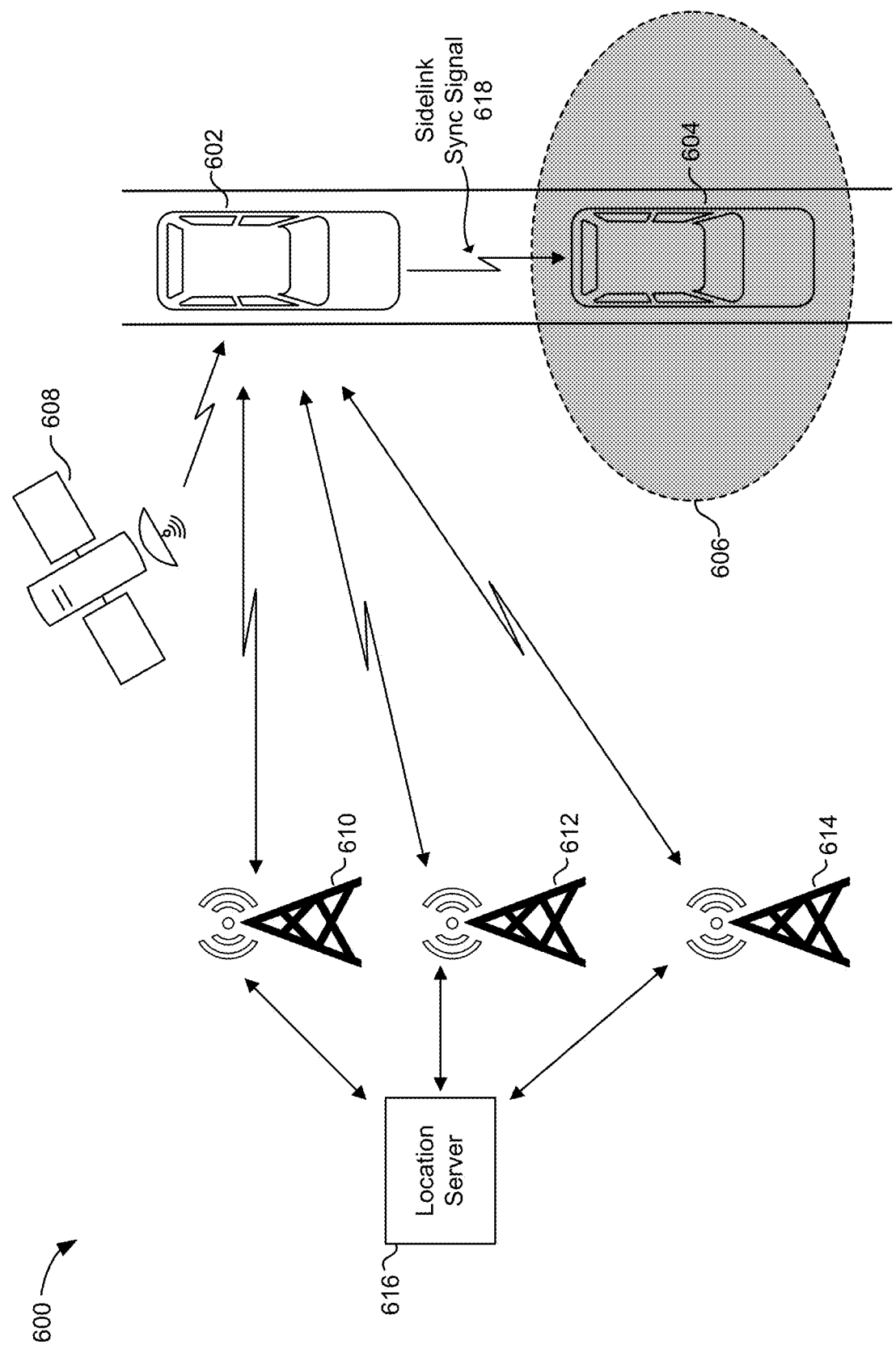
FIG. 6 is a diagram illustrating an example wireless communications system for implementing UE sidelink synchronization, according to aspects of the disclosure.

As noted previously, systems and techniques are described herein for optimizing transmission of a sidelink synchronization signal by a wireless device. FIG. 6 is a diagram illustrating an example wireless communications system 600 for configuring transmission of a sidelink synchronization signal by a wireless device. In some aspects, the system 600 may include one or more user equipment (UE) devices such as UE 602 and UE 604. As noted above, a UE device (e.g., UE 602 and/or UE 604) may include any wireless communication device (e.g., a mobile phone, router, tablet computer, laptop computer, tracking device, wearable device (e.g., smart watch, glasses, an extended reality (XR) device such as a virtual reality (VR) headset, an augmented reality (AR) headset or glasses, or a mixed reality (MR) headset, etc.), vehicle (e.g., automobile, motorcycle, bicycle, etc.), Internet of Things (IoT) device, etc.) used by a user to communicate over a wireless communications network.

In some examples, system 600 may include one or more base stations. For instance, system 600 can include base station 610, base station 612, and base station 614. In some cases, base station 610, base station 612, and/or base station 614 can be associated with UE 602 (e.g., UE 602 may communicate with base station 610 using a network (Uu) interface). In some aspects, one or more of the base stations (e.g., base station 610, base station 612, and/or base station 614) can communicate with location server 616 (e.g., configured to implement LMF 270).

In some cases, UE 602 and UE 604 can be configured to communicate using sidelink communications (e.g., PC5, DSRC, etc.). In some aspects, a UE that receives a sidelink communication (e.g., UE 602 and/or UE 604) can use a sidelink synchronization signal (SLSS) to synchronize to the transmitting UE to properly demodulate and/or decode received data. In some cases, the SLSS can include a primary sidelink synchronization signal (P-SSS) and/or a secondary sidelink synchronization signal (S-SSS). In some aspects, SLSS (e.g., the P-SSS and/or the S-SSS) can be included in a sidelink synchronization signal block (S-SSB). In some examples, the S-SSB can be transmitted as part of a Physical Sidelink Broadcast Channel (PSBCH).

In some cases, the source of the SLSS for a UE device can be a Global Navigation Satellite System (GNSS) signal, a base station signal, a signal from another UE, and/or an internal clock signal (e.g., clock generated by the UE device). In some examples, a UE device can have a preference for a source of the SLSS. In some examples, UE 602 may prioritize using the GNSS signal received from satellite 608 as the source of the SLSS. In some aspects, if a GNSS signal is not available, UE 602 may utilize a downlink signal from a base station (e.g., base station 610, base station 612, and/or base station 614) as the source of the SLSS. In some examples, if UE 602 cannot receive a GNSS signal or a base station signal, UE 602 may utilize a signal from another UE as the source of the SLSS. In some cases, if no external source (e.g., GNSS satellite, base station, or other UE) for the SLSS is available, UE 602 may utilize an internal clock as the source of the SLSS.

In some cases, a UE device may be located within a geographic area where the UE device is unable to receive a GNSS signal and/or a base station signal for use as a sidelink synchronization source. As illustrated, UE 604 is located within shielded geographic area 606. In some cases, shielded geographic area 606 may correspond to a geographic area in which GNSS signal quality and/or base station signal quality is deficient (e.g., not accessible or below a threshold signal quality). Illustrative examples of shielded geographic area 606 can include a tunnel, an urban canyon, a forest, a parking garage, and/or any other geographic area in which GNSS signal quality and/or base station signal quality is deficient.

In some aspects, UE device 602 can be configured to transmit the SLSS proactively (e.g., on demand) to provide a sidelink synchronization source before one or more UE devices lose the sidelink synchronization source (e.g., the GNSS signal and/or the base station signal). For example, UE device 602 can be configured to transmit SLSS 618 to UE device 604 before, during, and/or after the time that UE 604 is inside shielded geographic area 606.

In some examples, a base station (e.g., base station 610, base station 612, and/or base station 614) can instruct UE 602 to transmit SLSS 618 based the location of UE 602 relative to shielded geographic area 606. For example, location server 616 (e.g., LMF 270) can calculate the position of UE 602 (e.g., based on positioning reference signals, UL/DL measurements, etc.). In some cases, location server 616 can determine the position of UE 602 within 50 meters (m) of accuracy. In some aspects, location server 616 can determine the position of UE 602 within 10 m of accuracy.

In some aspects, location server 616 can send the location data associated with UE 602 to one or more base stations that are in proximity of shielded geographic area 606. In some cases, a base station can use the location data to determine that UE 602 is in close proximity to shielded geographic area 606. For example, location server 616 can send the location of UE 602 to base station 614 and base station 614 can use the location data to determine the proximity of UE 602 to shielded geographic area 606. In some cases, base station 614 can instruct UE 602 to transmit SLSS 618 when UE 602 is near shielded geographic area 606. In some example, base station 614 can instruct UE 602 to transmit SLSS 618 when UE 602 is within a threshold distance of shielded geographic area 606. For instance, base station 614 can instruct UE 602 to transmit SLSS 618 when UE 602 is within 1000 m of shielded geographic area 606.

In some examples, the location server 616 may use the position of UE 602 to determine a location of UE 602 on a map. For example, location server 616 may access map data and determine the proximity of UE 602 to shielded geographic area 606. In some cases, location server 616 may send a message to a base station (e.g., base station 614) to instruct UE 602 to transmit SLSS 618. In some aspects, multi-access edge computing (MEC) may be used to implement UE device location functions (e.g., performed by LMF 270). In some configurations, MEC can be utilized to reduce latency in signaling a UE device to transmit a sidelink synchronization signal.

In some aspects, a base station (e.g., base station 610, base station 612, and/or base station 614) can instruct UE 602 to transmit SLSS 618 based on a geofence configuration corresponding to geographic areas associated with poor signal quality (e.g., shielded geographic area 606). For example, base station 614 can instruct UE 602 to transmit SLSS 618 based on a proximity to shielded geographic area 606 (e.g., based on the location of base station 614). In some examples, a base station may instruct all associated UE devices to transmit a sidelink synchronization signal. In some cases, a base station may instruct all associated UE devices within a zone or region to transmit a sidelink synchronization signal. In some instances, a base station may use UE location data (e.g., received from location server 616) to select UE devices that are to transmit a sidelink synchronization signal.

In some cases, a geofence configuration of shielded geographic area 606 can be based on a cell identifier. For instance, a footprint or geofence corresponding to shielded geographic area 606 can correspond to one or more base station identifiers corresponding to base station 610, base station 612, and/or base station 614. In some aspects, the identifier(s) associated with a geofence may include a physical cell identifier (PCI), a virtual cell identifier (VCI), and/or a cell global identifier (CGI). In some cases, the base station identifiers for implementing geofencing of shielded geographic area 606 can be based on cell handover and/or cell reselection configurations. In some aspects, base station geofencing (e.g., to identify shielded geographic area 606) can be configured per network operator (e.g., configured per public land mobile network (PLMN)).

In some examples, a base station may instruct a UE device to transmit a sidelink synchronization signal without modifying an existing sidelink specification (e.g., without any change to 3GPP standard) For example, a geofencing configuration and/or UE location data can be used by a base station to instruct a particular UE device (e.g., UE 602) that is outside of shielded geographic area 606 to transmit SLSS 606. In some aspects, the base station can direct the instruction to a particular UE device. In some cases, UE devices that do not receive the instruction will not transmit a sidelink synchronization signal while associated with a base station signal that meets a reference signal received power (RSRP) threshold.

In some aspects, a UE can determine whether to transmit a sidelink synchronization signal based on data associated with the UE. For example, UE 602 can use the GNSS signal from satellite 608 and/or other positioning signals (e.g., positioning signals from a base station) to determine that UE 602 is located near shielded geographic area 606. In some aspects, UE 602 can use location data and/or base station identification (e.g., cell ID) to determine whether to initiate and/or discontinue transmission of SLSS 618.

In some examples, UE 602 can be configured with geofencing data directing UE 602 to initiate transmission of SLSS 618 when UE 602 is within a threshold distance (e.g., 200 m, 500 m, etc.) of shielded geographic area 606. In some cases, UE 602 can use a cell ID fingerprinting algorithm to determine the start and/or stop conditions (e.g., geofence boundaries) for transmitting SLSS 618. In some aspects, the parameters (e.g., cell ID, geofencing, position coordinates, etc.) used to implement conditional transmission of SLSS 618 can be part of a sidelink configuration in UE 602. In some cases, the sidelink configuration in UE 602 can override a default configuration from a base station (e.g., UE 602 can transmit SLSS 618 in the absence of an instruction to transmit SLSS 618). In some examples, the sidelink configuration in UE 602 may be provided by a base station (e.g., base station 610, base station 612, and/or base station 614).

In some aspects, a sidelink configuration for a UE device may reduce S-SSB packet collisions. For example, the sidelink configuration for UE 602 can be used to limit the locations where UE 602 may transmit a sidelink synchronization signal. In some examples, a reduction in the number of UE devices that transmit a sidelink synchronization signal can reduce interference (e.g., S-SSB packet collisions), provide power savings, and/or reduce heat dissipation.

In some cases, UE 602 can use a machine learning algorithm to identify shielded geographic area 606. In some examples, UE 602 can use a machine learning algorithm to determine whether to transmit a sidelink synchronization signal (e.g., SLSS 618). For instance, a machine learning algorithm can collect data from one or more sensors (e.g., sensor system 456) associated with UE 602. In some cases, the machine learning algorithm can use the data from sensor system 456 to identify shielded geographic area 606. In some instances, the machine learning algorithm may perform image classification to identify areas such as tunnels, parking garages, forests, urban canyons, etc. that are associated with degraded GNSS signals and/or degraded base station signals. In another example, a machine learning algorithm may collect signal quality data (e.g., GNSS signal quality data and/or base station signal quality data) that may be correlated with UE device location data. In some cases, the signal quality data and the UE location data can be used by a machine learning algorithm to identify or predict geographic areas where a GNSS signal and/or a base station signal may be degraded (e.g., shielded geographic area 606).

In some examples, UE 602 can identify shielded geographic area 606 based on crowdsourced data received from other UE devices. For example, UE devices can be configured to track and store GNSS signal quality data and/or base station signal quality data relative to UE device location. In some cases, the crowdsourced data can be provided to and/or stored on a server (e.g., location server 616 and/or any other server). In some examples, the crowdsourced data can be used by the server and/or by UE devices to identify geographic areas in which the UE device may be configured to transmit a sidelink synchronization signal. For example, crowdsourced data can be used to identify shielded geographic area 606 as a location that is associated with a deficient GNSS signal and/or a deficient base station signal. In some cases, crowdsourced data can be used to configure UE 602 to transmit SLSS 618 based on a proximity of UE 602 to shielded geographic area 606.

In some examples, UE 602 and UE 604 may use sidelink communications to associate and form a UE platoon (e.g., a cluster of associated UE devices). In some cases, a UE platoon can include a platoon leader that is configured to transmit a sidelink synchronization signal to the UE devices in the UE platoon. In some examples, UE devices in a UE platoon may designate a platoon leader based on a position of the UE devices within the platoon. In some cases, the platoon leader (e.g., sidelink synchronization source for the platoon) may be selected to be the last UE device in the platoon to lose GNSS and/or base station connectivity (e.g., UE device at back of platoon). In one illustrative example, UE 602 can be designated as the platoon leader configured to transmit SLSS 618 based on the position of UE 602 at the back of the platoon (e.g., UE 602 will enter shielded geographic area 606 after UE 604).

In some aspects, UE 602 and/or UE 604 may initiate formation of a UE platoon in anticipation of entering shielded geographic area 606. In some examples, two or more UE devices may form a UE platoon based on parameters that can include UE locality (e.g., distance between UE devices), direction of travel, lane position (e.g., UE devices in same lane or adjacent lanes), speed of travel, UE capability (e.g., UE sidelink configuration, UE capability to propagate SLSS, UE capability to be configured as independent SLSS source, etc.), and/or any other UE parameter, attribute, or metric.

Figure 7A:
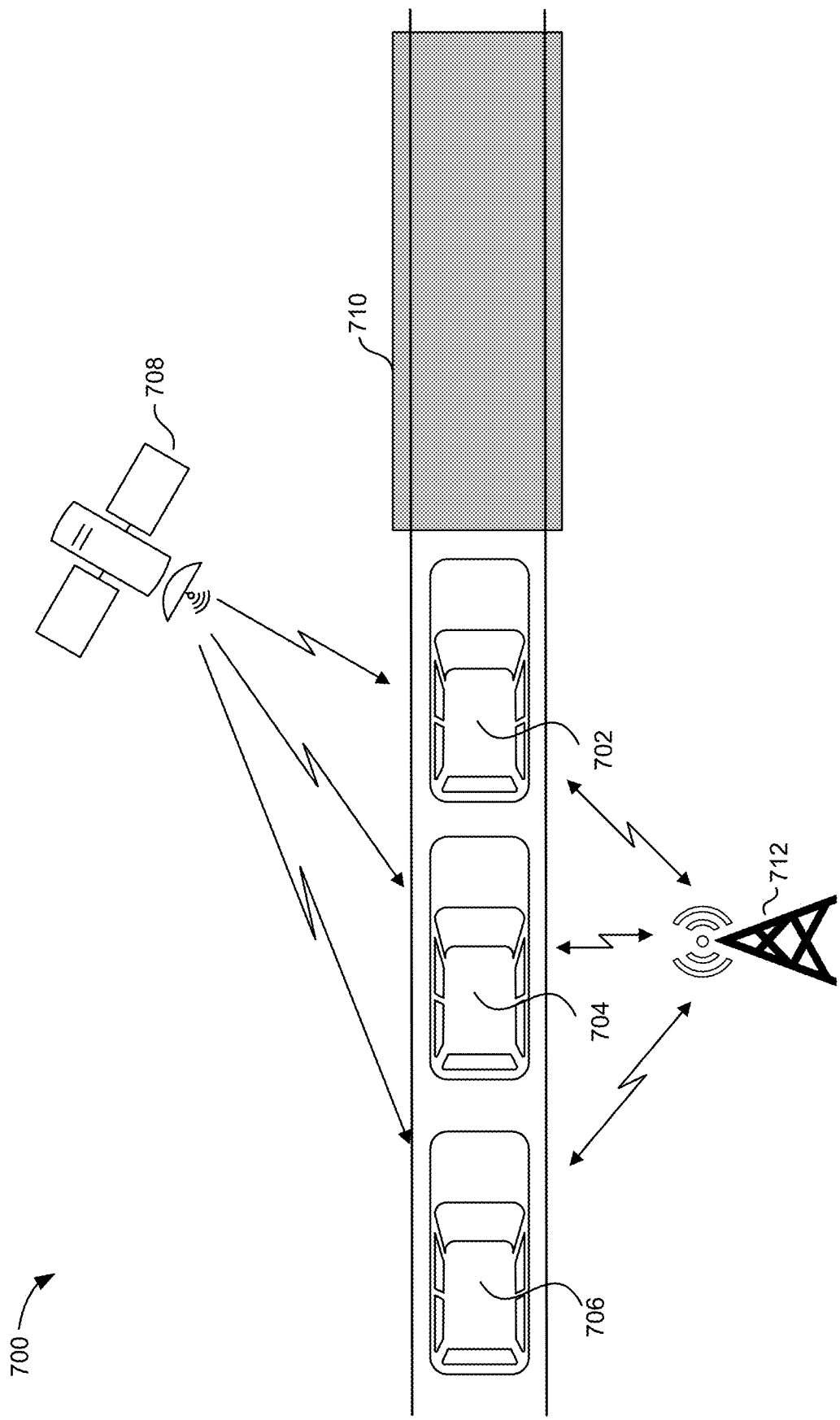
FIGS. 7A-7D illustrate example configurations for implementing a UE platoon for sidelink synchronization, according to aspects of the disclosure.

FIG. 7A illustrates a system 700 for implementing a UE platoon for synchronizing sidelink communications. In some examples, system 700 can include UE 702, UE 704, and UE 706 that can each receive a GNSS signal from satellite 708. In some aspects, the GNSS signal from satellite 708 can be used as a sidelink synchronization signal (SLSS). In some examples, UE 702, UE 704, and UE 706 can communicate using sidelink communications and use the GNSS signal from satellite 708 as a SLSS to demodulate received data. In some cases, each UE device (e.g., UE 702, UE 704, and UE 706) in system 700 can be associated with base station 712.

In some aspects, system 700 can include a tunnel 710 that is associated with a deficient GNSS signal and/or a deficient base station signal. In some examples, tunnel 710 can correspond to any shielded geographic area (e.g., parking garage, urban canyon, forest, etc.) in which a UE device may not receive a suitable GNSS signal and/or a suitable base station signal.

In some examples, UE 702 may determine that UE 702 is approaching tunnel 710. In some aspects, UE 702 may identify tunnel 710 by performing image classification and/or object recognition that can be associated with tunnel 710 (e.g., based on a machine learning algorithm). In some cases, UE 702 may identify tunnel 710 based on crowdsourced data that is provided to a server by other UE devices. In some aspects, UE 702 can identify tunnel 710 based on a machine learning algorithm that processes signal quality data (e.g., GNSS signal quality and/or base station signal quality) and UE device location data. In some examples, UE 702 may identify tunnel 710 based on signaling received from base station 712 (e.g., based on UE location data processed by LMF 270). In some cases, UE 702 can identify tunnel 710 based on geofencing implemented by base station 712. In some examples, UE 702 may identify tunnel 710 based on a UE sidelink configuration (e.g., UE geofencing based on cell ID).

In some cases, UE 702 may initiate formation of a UE platoon prior to entering tunnel 710. In some examples, UE 702 can send a sidelink communication to UE 704 and/or UE 706 to initiate formation of a UE platoon. In some aspects, UE 702, UE 704, and UE 706 may form a UE platoon based on parameters that can include UE locality (e.g., distance between UE devices), direction of travel, lane position, speed of travel, and/or UE capability. For example, UE 702, UE 704, and UE 706 can form a UE platoon in response to determining that each of the respective UE devices is travelling in a same traffic lane. In another example, UE 702, UE 704, and UE 706 can form a UE platoon in response to determining that each of the respective UE devices is travelling within 5 miles-per-hour (mph) of each other. In another example, UE 702, UE 704, and UE 706 can form a UE platoon in response to determining that each of the respective UE devices is within 50 m of each other. In another example, UE 702, UE 704, and UE 706 can form a UE platoon in response to determining that each of the respective UE devices has the capability to be configured as a sidelink synchronization signal source.

In some aspects, UE 702, UE 704, and UE 706 can send sidelink communications to determine the respective position of each UE device within the UE platoon. For example, UE 702 can be identified as the "head" of the UE platoon and UE 706 can be identified as the "tail" of the UE platoon. In some cases, the position of a UE device within the UE platoon can be used to determine a platoon leader. In some instances, the platoon leader can correspond to the UE device that will transmit the sidelink synchronization signal (e.g., the UE device that will be configured as the sidelink synchronization source).

In some cases, the platoon leader (e.g., sidelink synchronization source for the platoon) may be selected to be the last UE device in the platoon to lose GNSS and/or base station connectivity (e.g., UE device at back of platoon). In one illustrative example, UE 706 can be designated as the platoon leader configured to transmit a sidelink synchronization signal to UE 702 and UE 704 based on the position of UE 706 at the back of the platoon (e.g., UE 706 will be last to enter tunnel 710). In another example, the platoon leader may be selected to be a UE device that is in the center of the UE platoon. For instance, UE 704 can be selected as the platoon leader in order to minimize the transmission distance of the sidelink synchronization signal (e.g., from UE 704 to UE 706 and from UE 704 to UE 702).

In some cases, the designation of the platoon leader can be changed dynamically based on a change in the relative positions of the UE devices. For instance, UE 704 can be designated as the platoon leader if UE 704 positioned as the last device in the UE platoon (e.g., UE 704 is passed by UE 706 prior to entering tunnel 710). In another example, UE 702 can be designated as the platoon leader if UE 702 is passed by UE 704 and UE 706 prior to entering tunnel 710.

In some examples, UE devices may join or leave the UE platoon at different times. In some cases, changes in the makeup of the UE platoon may result in a change of the platoon leader.

In some aspects, the formation of the UE platoon (e.g., arrangement and/or positioning of UE devices within the UE platoon) can be configured based on factors such as the number of UE devices in the UE platoon, the number of traffic lanes, the length of the tunnel, etc. For example, a UE platoon that includes six UE devices can have a 6×1 formation (e.g., six vehicles in one lane) or a 3×2 formation (e.g., 3 vehicles in each of 2 parallel lanes). In some examples, the formation of the UE platoon can be configured to provide efficient clustering of UE devices in the UE platoon. In some cases, efficient clustering of UE devices can correspond to a platoon formation where the UE devices are in closer proximity of each other. In some examples, efficient clustering of UE devices can correspond to a platoon formation that minimizes the transmission distance between the platoon leader (e.g., transmitting the sidelink synchronization signal) and the UE device that is furthest from the platoon leader.

In some aspects, the formation of the UE platoon can be configured based on the length of a tunnel. For example, the length of a column (e.g., UE devices in a line in the direction of travel) in the UE platoon can be relative to the length of the tunnel (e.g., a shorter tunnel can correspond to a shorter column length). In some examples, the formation of the UE platoon can be dynamically updated. For instance, the formation of the UE platoon may change based on a change in the number of UE devices in the UE platoon, a change in the number of traffic lanes available, traffic conditions, transmission signal quality, etc.

Figure 7B:
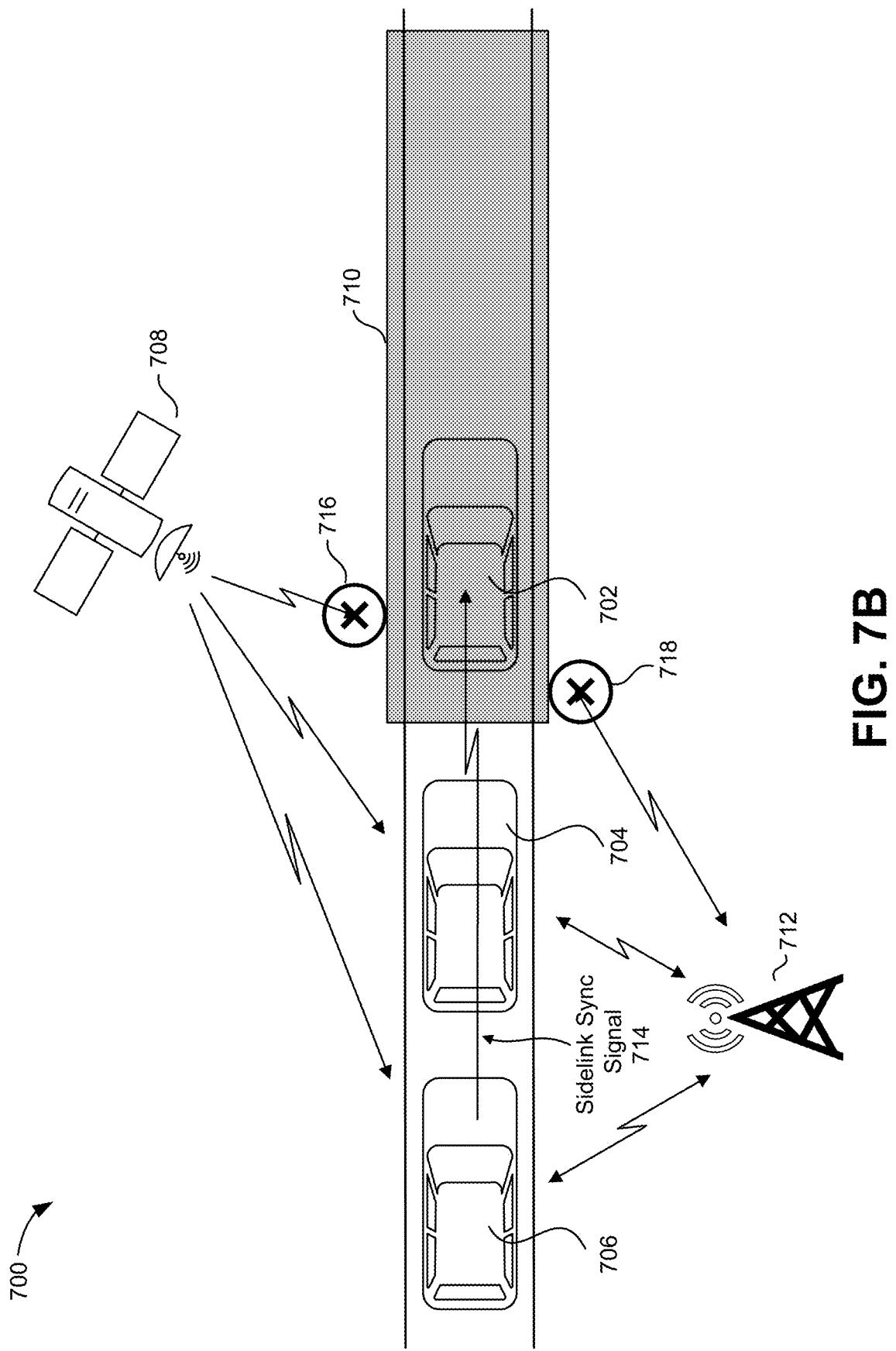

FIG. 7B illustrates a configuration of system 700 that can follow the configuration illustrated in FIG. 7A. In some aspects, UE 702 can be positioned inside of tunnel 710 while UE 704 and UE 706 are positioned outside of tunnel 710. In some examples, UE 704 and UE 706 can receive a GNSS signal from satellite 708. In some cases, UE 704 and UE 706 can be associated with base station 712. In some examples, UE 702 may not be able to receive a GNSS signal (illustrated by 'X' 716) from satellite 708 while inside of tunnel 710. In some cases, UE 702 may not be able to receive a base station signal (illustrated by 'X' 718) from base station 712 while inside of tunnel 710.

In some aspects, UE 706 can be configured as the platoon leader for the UE platoon that includes UE 702, UE 704, and UE 706. In some cases, UE 706 can transmit sidelink synchronization signal (SLSS) 714 that is based on GNSS signal from satellite 708. In some examples, UE 702 can receive SLSS 714 from UE 706 and use SLSS 714 to demodulate sidelink communications from UE 704 and/or UE 706. In some cases, UE 704 can continue to use the GNSS signal from satellite 708 as a SLSS.

Figure 7C:
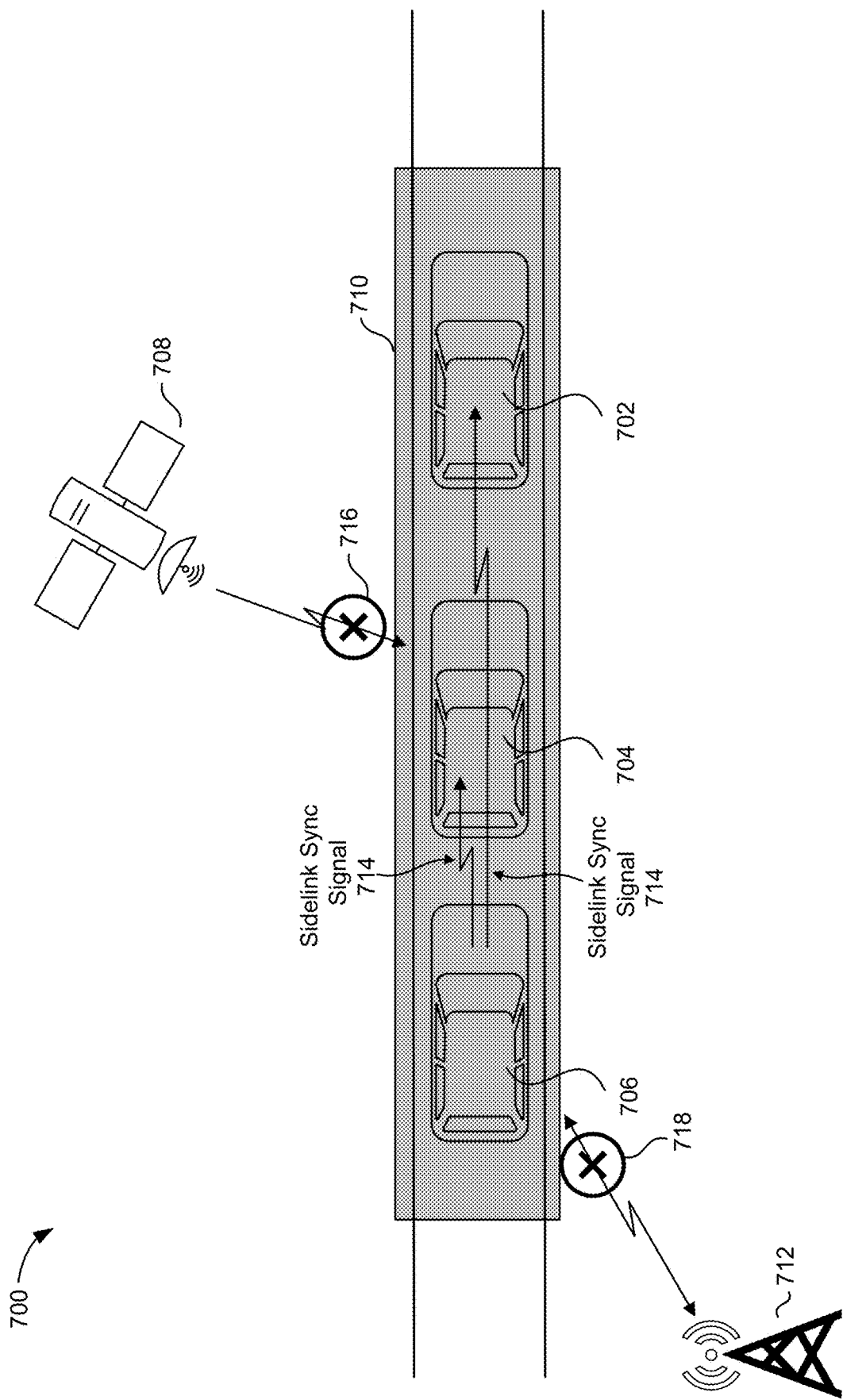

FIG. 7C illustrates a configuration of system 700 that can follow the configuration illustrated in FIG. 7B. In some aspects, each of the UE devices (e.g., UE 702, UE 704, and UE 706 can be positioned inside of tunnel 710. In some examples, the UE devices may not be able to receive a GNSS signal (illustrated by 'X' 716) from satellite 708 while inside of tunnel 710. In some cases, the UE devices may not be able to receive a base station signal (illustrated by 'X' 718) from base station 712 while inside of tunnel 710.

In some aspects, UE 702, UE 704, and UE 706 may continue to communicate using sidelink communications while inside of tunnel 710. In some examples, UE 706 can be configured as the platoon leader that transmits SLSS 714 to UE 702 and UE 704. In some cases, UE 702 and/or UE 704 can receive SLSS 714 from UE 706 and use SLSS 714 to demodulate sidelink communications.

Figure 7D:
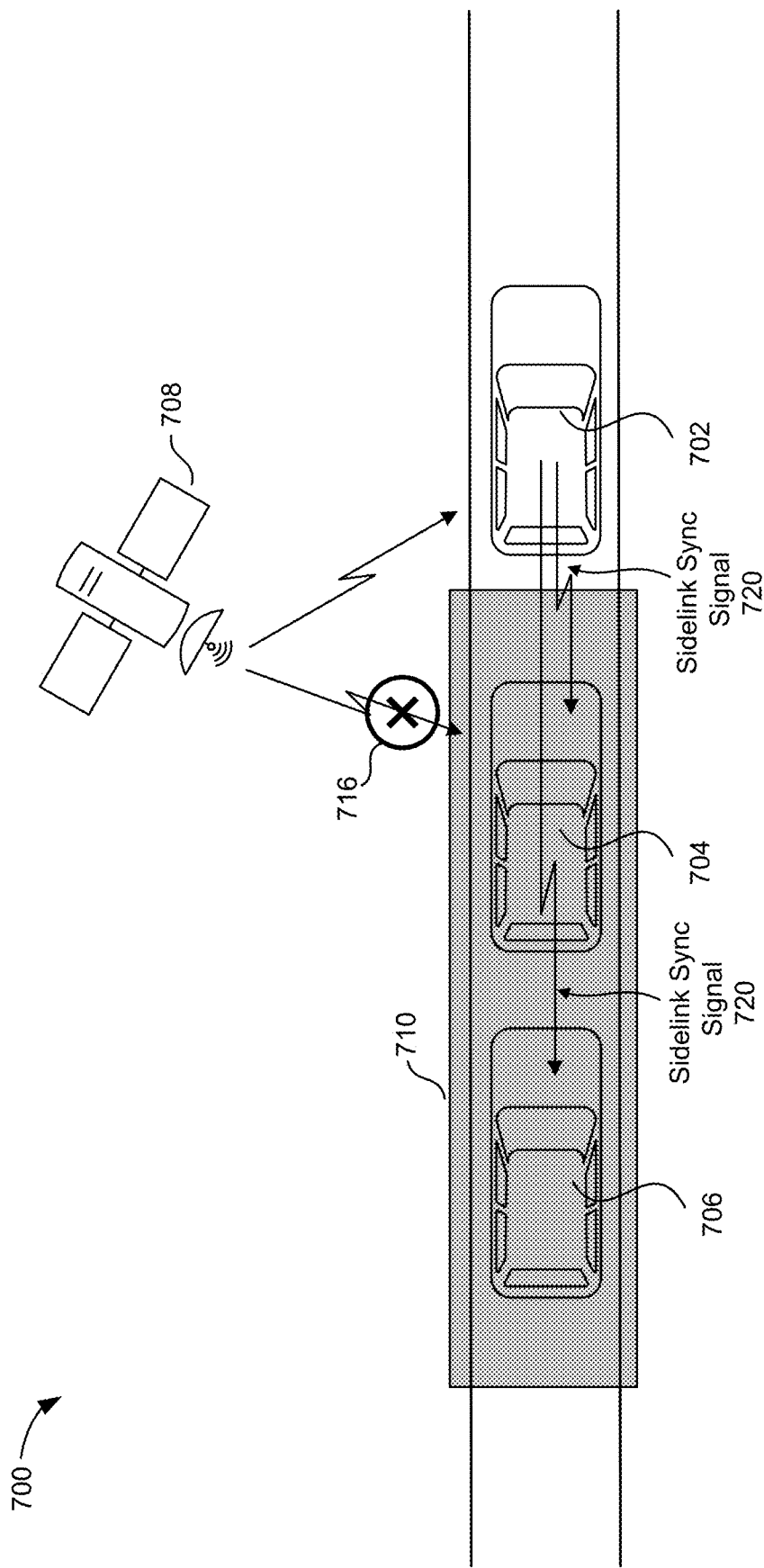

FIG. 7D illustrates a configuration of system 700 that can follow the configuration illustrated in FIG. 7C. In some aspects, UE 706 and UE 704 can be positioned inside of tunnel 710 while UE 702 is positioned outside of tunnel 710. In some examples, UE 704 and UE 706 may not be able to receive a GNSS signal (illustrated by 'X' 716) from satellite 708 while inside of tunnel 710. In some cases, UE 702 may receive GNSS signal from satellite 708 upon exiting tunnel 710.

In some aspects, the UE 702 can be configured as the platoon leader upon exiting tunnel 710. In some examples, UE 702 can transmit SLSS 720 based on reception of GNSS signal from satellite 708. In some cases, UE 706 and UE 704 can receive SLSS 720 from UE 702 and use SLSS 720 to demodulate sidelink communications.

In some cases, UE 702 can determine whether there is any drift or variance between SLSS 714 (e.g., the SLSS that UE 702 received from UE 706) and the GNSS signal from satellite 708. In some aspects, UE 702 may intelligently decide whether to transmit SLSS 720 based on any calculated drift or variance between the synchronization signals. For example, UE 702 may determine that the drift or variance between SLSS 714 and the GNSS signal may adversely affect demodulation of current sidelink communications. In such cases, UE 706 may continue to transmit the sidelink synchronization signal to the UE platoon until each of the UE devices has exited tunnel 710. In some examples, an application layer protocol can be used to dynamically change the SLSS (e.g., sidelink synchronization signal block) transmission based on network conditions and/or UE platoon configuration.

Figure 8:
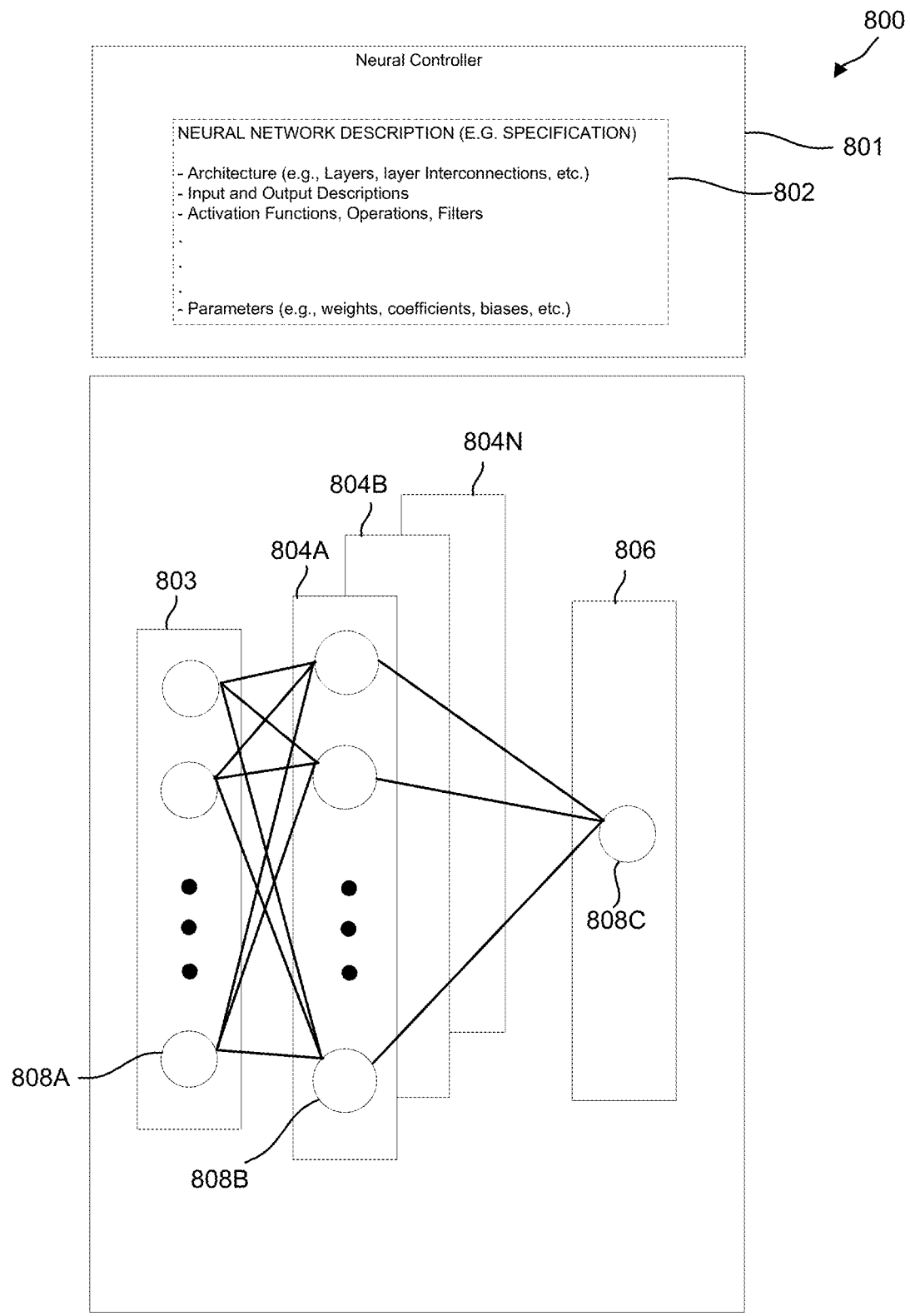
FIG. 8 is a diagram illustrating an example machine learning model that can be configured to determine geographic areas for implementing UE sidelink synchronization, according to aspects of the disclosure.

FIG. 8 illustrates an example neural architecture of a neural network 800 that can be trained for identifying and/or determining geographic areas that are associated with deficient sidelink synchronization source signals (e.g., deficient GNSS signal and/or deficient base station signal). The example neural architecture of the neural network 800 may be defined by an example neural network description 802 in neural controller 801. The neural network 800 is an example of a machine learning model that can be deployed and implemented at the base station 102 and/or the UE 104. The neural network 800 can be a feedforward neural network or any other known or to-be-developed neural network or machine learning model.

The neural network description 802 can include a full specification of the neural network 800, including the neural architecture shown in FIG. 8. For example, the neural network description 802 can include a description or specification of architecture of the neural network 800 (e.g., the layers, layer interconnections, number of nodes in each layer, etc.); an input and output description which indicates how the input and output are formed or processed; an indication of the activation functions in the neural network, the operations or filters in the neural network, etc.; neural network parameters such as weights, biases, etc.; and so forth.

The neural network 800 can reflect the neural architecture defined in the neural network description 802. The neural network 800 can include any suitable neural or deep learning type of network. In some cases, the neural network 800 can include a feed-forward neural network. In other cases, the neural network 800 can include a recurrent neural network, which can have loops that allow information to be carried across nodes while reading in input. The neural network 800 can include any other suitable neural network or machine learning model. One example includes a convolutional neural network (CNN), which includes an input layer and an output layer, with multiple hidden layers between the input and out layers. The hidden layers of a CNN include a series of hidden layers as described below, such as convolutional, nonlinear, pooling (for downsampling), and fully connected layers. In other examples, the neural network 800 can represent any other neural or deep learning network, such as an autoencoder, a deep belief nets (DBNs), a recurrent neural network (RNN), etc.

In the non-limiting example of FIG. 8, the neural network 800 includes an input layer 803, which can receive one or more sets of input data. The input data can be any type of data such as one or more parameters associated with a GNSS signal and/or a downlink signal from a base station (e.g., GNSS signal from satellite 608 to UE 602 and/or downlink communication from base station 610 to UE 602) such as channel state information (CSI), received signal strength, signal to interference ratio, signal to noise ratio, signal throughput, location data, environmental conditions, UE mobility status, etc.), time-frequency resources (e.g., frame, sub-bands, resource element, resource blocks, etc.), etc. The input data can also include image data that can be used to train the neural network 800 to perform image classification and/or object recognition.

The neural network 800 can include hidden layers 804A through 804N (collectively "804" hereinafter). The hidden layers 804 can include n number of hidden layers, where n is an integer greater than or equal to one. The n number of hidden layers can include as many layers as needed for a desired processing outcome and/or rendering intent. In one illustrative example, any one of the hidden layer 804 can include data representing one or more of the data provided at the input layer 803 such as one or more parameters associated with a GNSS signal or a downlink signal such as channel state information, received signal strength, signal to interference ratio, signal to noise ratio, signal throughput, location data, environmental conditions, UE mobility status, etc.), time-frequency resources (e.g., frame, sub-bands, resource element, resource blocks, etc.), etc.

The neural network 800 further includes an output layer 806 that provides an output resulting from the processing performed by hidden layers 804. The output layer 806 can provide output data based on the input data. In one example, in the context related to a determination and/or indication of geographic areas that are associated with deficient sidelink synchronization source signals, the output can include location data that can be used to identify geographic areas such as shielded geographic area 606.

In the example of FIG. 8, the neural network 800 is a multi-layer neural network of interconnected nodes. Each node can represent a piece of information. Information associated with the nodes is shared among the different layers and each layer retains information as information is processed. Information can be exchanged between the nodes through node-to-node interconnections between the various layers. The nodes of the input layer 803 can activate a set of nodes in the first hidden layer 804A. For example, as shown, each input node of the input layer 803 is connected to each node of the first hidden layer 804A. The nodes of the hidden layer 804A can transform the information of each input node by applying activation functions to the information. The information derived from the transformation can then be passed to and can activate the nodes of the next hidden layer (e.g., 804B), which can perform their own designated functions. Example functions include convolutional, up-sampling, data transformation, pooling, and/or any other suitable functions. The output of hidden layer (e.g., 804B) can then activate nodes of the next hidden layer (e.g., 804N), and so on. The output of last hidden layer can activate one or more nodes of the output layer 806, at which point an output is provided. In some cases, while nodes (e.g., nodes 808A, 808B, 808C) in the neural network 800 are shown as having multiple output lines, a node has a single output and all lines shown as being output from a node represent the same output value.

In some cases, each node or interconnection between nodes can have a weight that is a set of parameters derived from training the neural network 800. For example, an interconnection between nodes can represent a piece of information learned about the interconnected nodes. The interconnection can have a numeric weight that can be tuned (e.g., based on a training dataset), allowing the neural network 800 to be adaptive to inputs and able to learn as more data is processed.

The neural network 800 can be pre-trained to process the features from the data in the input layer 803 using different hidden layers 804 in order to provide the output through the output layer 806. For example, in some cases, the neural network 800 can adjust weights of nodes using a training process called backpropagation.

Backpropagation can include a forward pass, a loss function, a backward pass, and a weight update. The forward pass, loss function, backward pass, and parameter update can be performed for one training iteration. The process can be repeated for a certain number of iterations for each set of training data until the weights of the layers are accurately tuned (e.g., meet a configurable threshold determined based on experiments and/or empirical studies).

Once trained, the neural network 800 can receive as input one or more parameters associated with a communication channel between the UE 104 and UE 190. Such parameters can include, but are not limited to, parameters and/or measurements associated with downlink communications (e.g., channel state information, received signal strength, signal to interference ratio, signal to noise ratio, signal throughput, location data, etc.), environmental conditions (e.g., weather conditions, indoor/outdoor channel conditions, and/or cellular or wireless connectivity, transmission capabilities and power of the base station 102 and/or the UE 104, etc.), mobility status of the UE 104 and/or the UE 190 (e.g., movement of a UE with respect to another UE and/or base station), geographic coordinates, image data, signal measurements from other UE devices, etc.

Once trained, the neural network 800 can log parameters, channel conditions, signal measurements, location information, image data, and/or other information (e.g., base station identifier, etc.), and can associate the same with sidelink synchronization signal status. For example, the trained neural network 800 can determine which inputs (e.g., signal conditions, images, objects, etc.) are associated with geographic areas having degraded GNSS signal quality and/or degraded downlink base station signal quality. In some cases, the trained neural network 800 can be used to determine whether a UE device should transmit a sidelink synchronization signal. In some aspects, the trained neural network 800 can be used to determine whether a base station should instruct a UE device to transmit a sidelink synchronization signal. In some examples, the trained neural network 800 may be continuously updated or retrained (e.g., using an online learning approach).

As noted above, the output of the trained neural network 800, whether implemented at the base station 102 and/or the UE 104, can identify geographic areas associated with a deficient GNSS signal and/or a deficient base station signal. In some aspects, the output of the trained neural network 800 can be used by a UE device to initiate transmission of a sidelink synchronization signal. In some cases, the output of the trained neural network 800 can be used by a UE device to initiate formation of a UE platoon with one or more other UE devices. In some examples, the output of trained neural network 800 can be used by a base station or a location server to instruct a UE device to transmit a sidelink synchronization signal. In some cases, the output of the trained neural network 800 can be used by a base station or a location server to implement a geofencing configuration in which UE devices are instructed to transmit a sidelink synchronization signal.

Figure 9:
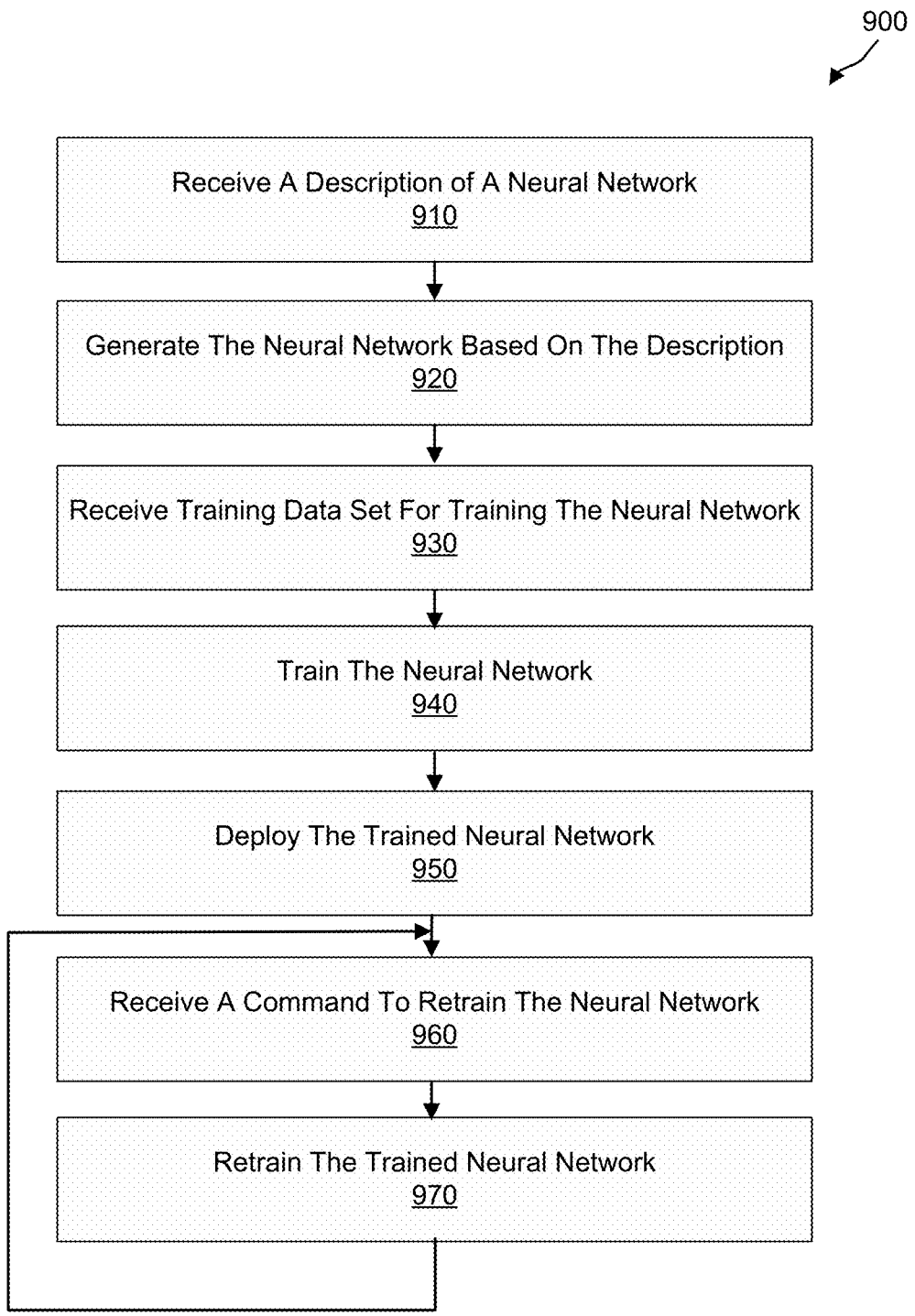
FIG. 9 is a flow chart illustrating an example of a process of training a machine learning algorithm for determining geographic areas for implementing UE sidelink synchronization, according to aspects of the disclosure.

FIG. 9 is a flow chart of a process 900 of training a machine learning algorithm, such as neural network 800, for identifying geographic areas associated with a deficient GNSS signal and/or a deficient base station signal, in accordance with some aspects of the present disclosure. Operation of FIG. 9 will be described in relation to FIG. 8. Neural network 800 may be implemented at the base station 102 or the UE 104.

At operation 910, the neural controller 801 receives a description of the structure of the neural network 800 (e.g., from base station 102) including, but not limited to, the architecture of the neural network 800 and definition of layers, layer interconnections, input and output descriptions, activation functions, operations, filters, parameters such as weights, coefficients, biases, etc. In some examples, the description can be received from a device based on a user input received by the device (e.g., input via an input device, such as a keyboard, mouse, touchscreen interface, and/or other type of input device). In some examples, operation 910 is optional and may not be performed. For example, the neural network 800 can be UE specific (e.g., executed by the UE) and thus the description and specific configurations of the neural network 800 may be provided by the UE 104. At operation 920, the neural network 800 is generated based on the description received at operation 910. Using the description, the neural controller 801 generates appropriate input, intermediate, and output layers with defined interconnections between the layers and/or any weights or other parameters/coefficients assigned thereto. The weights and/or other parameters/coefficients can be set to initialized values, which will be modified during training, as described below. In some examples, operation 920 is optional and may not be performed (e.g., when the neural network 800 is UE specific).

At operation 930, once the neural network 800 is defined, a training data set is provided to the input layer 803 of the neural network 800. As described above, the training data set can include, but is not limited to, one or more parameters associated with a GNSS signal and/or a downlink signal from a base station (e.g., GNSS signal from satellite 608 to UE 602 and/or downlink communication from base station 610 to UE 602) such as channel state information (CSI), received signal strength, signal to interference ratio, signal to noise ratio, signal throughput, location data, environmental conditions, UE mobility status, etc.), time-frequency resources (e.g., frame, sub-bands, resource element, resource blocks, etc.), etc. The input data can also include image data that can be used to train the neural network 800 to perform image classification and/or object recognition (e.g., recognize buildings, urban canyons, tunnels, etc.).

At operation 940, the neural network 800 is trained using the training data set. In one example, the training of the neural network 800 is an iterative process repeated multiple times and each time validated against a test data set. The test data set may include a set of one or more parameters similar to those used as part of the training dataset. During each iteration, the output at the output layer 806 can be compared to the test data set and a delta between the output at the output layer 806 at that iteration and the optimized output defined in the test data set is determined. The weights and other parameters or coefficients of the various layers can be adjusted based on the delta. The iterative process may continue until the delta for any given set of input parameters is less than a threshold. The threshold may be a configurable parameter determined based on experiments and/or empirical studies.

At operation 950 and once the neural network 800 is trained, the trained neural network 800 is deployed at the base station 102 and/or the UE 104. The trained neural network can then be used to identify geographic areas associated with a deficient GNSS signal and/or a deficient base station signal and/or configure transmission of a sidelink synchronization signal by one or more UE devices. As the measurements change, the receiving device (e.g., the base station 102 or the UE 104 on which the trained neural network 800 is deployed) can re-train the neural network 800 to determine updated mapping of relevant geographic areas.

At operation 960, a triggering condition for retraining the neural network 800 is detected. The command may be received after the trained neural network 800 is deployed and after each instance of configuring a UE device to transmit a sidelink synchronization signal. At operation 970, the neural network 800 is retrained using the parameters (e.g., location data, image data, GNSS signal quality, base station signal quality, etc.) received as part of the command at operation 960.

Figure 10:
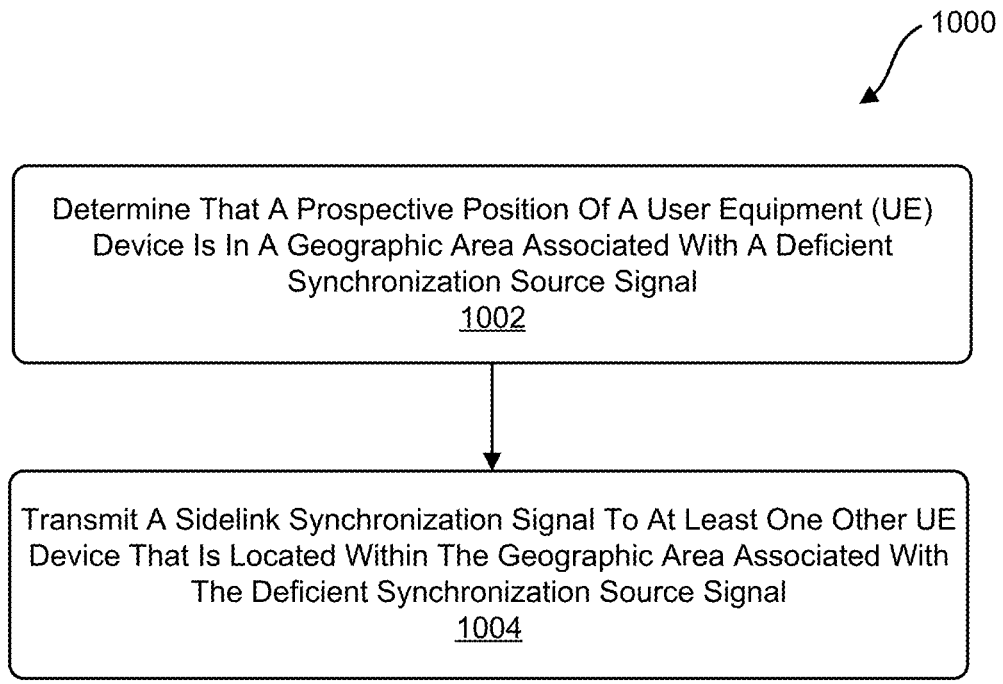
FIG. 10 is a flow diagram illustrating an example of a process for performing sidelink synchronization, according to aspects of the disclosure.

Retraining the neural network 800 may include adjusting weights, coefficients, biases, and/or parameters at different nodes of the different layers of the neural network 800. The operation 960 and 970 (the retraining of the neural network 800) may be continuously repeated, thus resulting in increased accuracy of the neural network 800 over time. Operations 960 and 970 are optional, and in some cases may not be performed FIG. 10 is a flow diagram illustrating an example of a process 1000 for performing sidelink synchronization. At block 1002, the process 1000 includes determining that a prospective position of a user equipment (UE) device is in a geographic area associated with a deficient synchronization source signal. For example, UE 602 can determine that a prospective position of UE 602 is in shielded geographic area 606 that is associated with a deficient synchronization source signal. In some aspects, the geographic area associated with the deficient synchronization source signal can include a geographic area associated with a deficient global navigation satellite system (GNSS) signal and a deficient base station signal. For instance, shielded geographic area 606 may be associated with a deficient GNSS signal (e.g., from satellite 608 and/or any other GNSS satellite) and shielded geographic area 606 may be associated with a deficient base station signal (e.g., from base station 610, base station 612, and/or base station 614).

In some aspects, the process 1000 can include receiving, from a base station, an indication of the geographic area associated with the deficient synchronization source signal. For example, UE 602 can receive an indication from base station 610, base station 612, and/or base station 614 that can be used to identify shielded geographic area 606. In some examples, the process 1000 can include identifying the geographic area using a machine learning image classification algorithm. For instance, UE 602 may use a machine learning image classification system to identify shielded geographic area 606. In some examples, UE 602 may use machine learning image classification to identify areas such as tunnels, parking garages, forests, urban canyons, etc. that may be associated with shielded geographic area 606.

In some cases, the process 1000 can include identifying the geographic area using GNSS signal quality data received from a plurality of UE devices. For example, UE 602 can identify shielded geographic area 606 using GNSS signal quality data received from other UEs (e.g., UE 604). In another example, UE 706 may identify tunnel 710 based on GNSS signal quality data received from UE 702 and/or UE 704.

At block 1004, the process 1000 includes transmitting a sidelink synchronization signal to at least one other UE device that is located within the geographic area associated with the deficient synchronization source signal. For instance, UE 602 may transmit sidelink synchronization signal 618 to UE 604 and UE 604 can be located within shielded geographic area 606.

In some aspects, the process 1000 can include associating with the at least one other UE device to form a UE platoon and identifying the UE device as a sidelink synchronization source for the UE platoon based on a position of the UE device relative to the at least one other UE device, wherein the sidelink synchronization source is configured to transmit a sidelink synchronization signal while at least a portion of the UE platoon is in the geographic area. In some cases, the position of the UE device can be behind the at least one other UE device.

For example, UE 602 can associate with UE 604 to form a UE platoon. In some cases, UE 602 can be identified as the sidelink synchronization source for the UE platoon based on the position of UE 602 relative to UE 604. For instance, UE 602 can be identified as the sidelink synchronization source for the UE platoon based on the position of UE 602 behind UE 604. In some instances, UE 602 can be configured to transmit sidelink synchronization signal 618 while UE 604 is in shielded geographic area 606.

In some cases, associating with the at least one other UE device to form the UE platoon can be based on at least one of UE direction of travel, a UE lane position, a UE speed, a UE capability, and a UE locality. For example, UE 602 may be associated with UE 604 to form a UE platoon based on a direction of travel of UE 602 and/or UE 604, a lane position of UE 602 and/or UE 604, a speed of UE 602 and/or UE 604, a capability (e.g., UE sidelink configuration) of UE 602 and/or UE 604, and/or a distance between UE 602 and UE 604.

In some aspects, to determine that the prospective position of the UE device is in the geographic area associated with the deficient synchronization signal the process 1000 can include receiving, from a base station, an indication that a current position of the UE device is within a threshold distance of the geographic area. For example, UE 602 can receive an indication from base station 610, base station 612, and/or base station 614 that a current position of UE 602 is within a threshold distance of shielded geographic area 606. In some examples, the indication can include a request to transmit the sidelink synchronization signal. For instance, the indication received by UE 602 from base station 610, base station 612, and/or base station 614 can include a request to transmit sidelink synchronization signal 618.

In some cases, the process 1000 can include determining that a current position of the UE device is within a threshold distance of the geographic area for transmission of the sidelink synchronization signal. For instance, UE 602 can determine that the current position of UE 602 is within a threshold distance of shielded geographic area 606 (e.g., based on geofencing data, cell ID fingerprinting, position coordinates, etc.).

Figure 11:
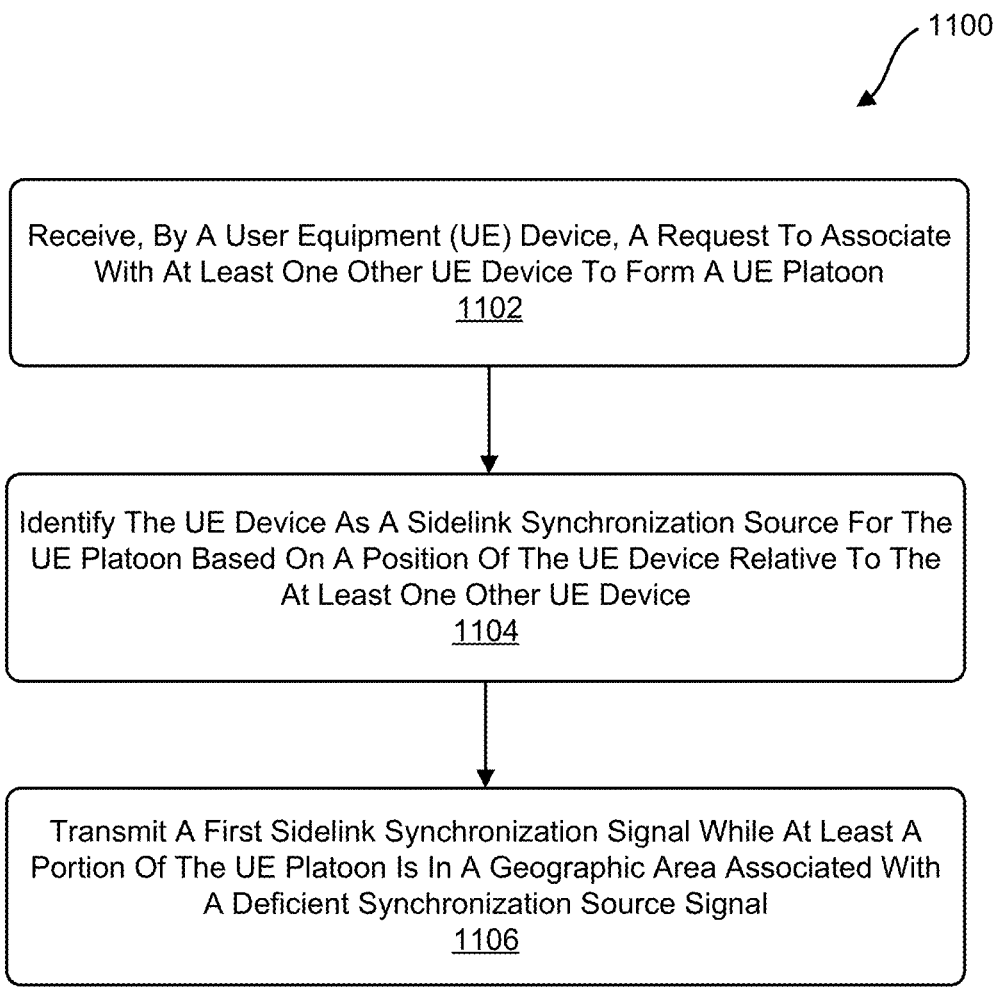
FIG. 11 is a flow diagram illustrating another example of a process for performing sidelink synchronization, according to aspects of the disclosure.

FIG. 11 is a flow diagram illustrating an example of a process 1100 for performing sidelink synchronization. At block 1102, the process 1100 includes receiving, by a user equipment (UE) device, a request to associate with at least one other UE device to form a UE platoon. For example, UE 706 can receive a request to associate with UE 704 and/or UE 706 to form a UE platoon.

At block 1104, the process 1100 includes identifying the UE device as a sidelink synchronization source for the UE platoon based on a position of the UE device relative to the at least one other UE device. For instance, UE 706 can be identified as a sidelink synchronization source for the UE platoon that includes UE 706, UE 704, and UE 702. In some examples, the position of the UE device is behind the at least one other UE device. For example, UE 706 can be identified as the sidelink synchronization source based on the position of UE 706 behind UE 704 and UE 702 (e.g., UE 706 will be last to enter tunnel 710).

At block 1106, the process 1100 includes transmitting a first sidelink synchronization signal while at least a portion of the UE platoon is in a geographic area associated with a deficient synchronization signal. For example, UE 705 can transmit sidelink synchronization signal 714 while UE 702 is inside of tunnel 710. In some aspects, the geographic area associated with the deficient synchronization source signal can include a geographic area associated with a deficient global navigation satellite system (GNSS) signal and a deficient base station signal. For instance, tunnel 710 may be associated with a deficient GNSS signal (e.g., from satellite 708 and/or any other GNSS satellite) and tunnel 710 may be associated with a deficient base station signal (e.g., from base station 712 and/or any other base station).

In some examples, the process 1100 can include receiving an indication of the geographic area from the at least one other UE device. For instance, UE 708 may receive an indication of tunnel 710 from UE 702 and/or UE 704. In some cases, UE 702 may provide the indication of tunnel 710 in response to detecting tunnel 710 using machine learning image classification, geofencing, geographic coordinates, signaling from base station 712, signaling from other UEs, and/or any other suitable technique.

In some cases, the process 1100 can include discontinuing transmission of the first sidelink synchronization signal in response to determining that the at least one other UE device has exited the geographic area. For example, UE 706 may discontinue transmission of sidelink synchronization signal 714 in response to determining that UE 702 is outside of tunnel 710 (e.g., UE 702 has access to GNSS signal from satellite 708). In some aspects, the process 1100 can include receiving a second sidelink synchronization signal from the at least one other UE device. For example, UE 706 may receive sidelink synchronization signal 720 from UE 702.

In some examples, the processes described herein (e.g., process 1000, process 1100, and/or other process described herein) may be performed by a computing device or apparatus (e.g., a UE, a base station, etc.). In one example, the process 1000 and/or the process 1100 may be performed by a wireless communication device, such as a UE (e.g., the vehicle 404 of FIG. 4, a mobile device, and/or other UE or device). In another example, the process 1000 and/or the process 1100 may be performed by a computing device with the computing system 1200 shown in FIG. 12. For instance, a wireless communication device (e.g., the vehicle 404 of FIG. 4, mobile device, and/or other UE or device) with the computing architecture shown in FIG. 12 may include the components of the UE and may implement the operations of FIG. 10 and/or the operations of FIG. 11.

In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, one or more network interfaces configured to communicate and/or receive the data, any combination thereof, and/or other component(s). The one or more network interfaces may be configured to communicate and/or receive wired and/or wireless data, including data according to the 3G, 4G, 5G, and/or other cellular standard, data according to the WiFi (802.11x) standards, data according to the Bluetooth™ standard, data according to the Internet Protocol (IP) standard, and/or other types of data.

The components of the computing device may be implemented in circuitry. For example, the components may include and/or may be implemented using electronic circuits or other electronic hardware, which may include one or more programmable electronic circuits (e.g., microprocessors, graphics processing units (GPUs), digital signal processors (DSPs), central processing units (CPUs), and/or other suitable electronic circuits), and/or may include and/or be implemented using computer software, firmware, or any combination thereof, to perform the various operations described herein.

The process 1000 and the process 1100 are illustrated as logical flow diagrams, the operation of which represents a sequence of operations that may be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations may be combined in any order and/or in parallel to implement the processes.

Additionally, the process 1000, process 1100, and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 12:
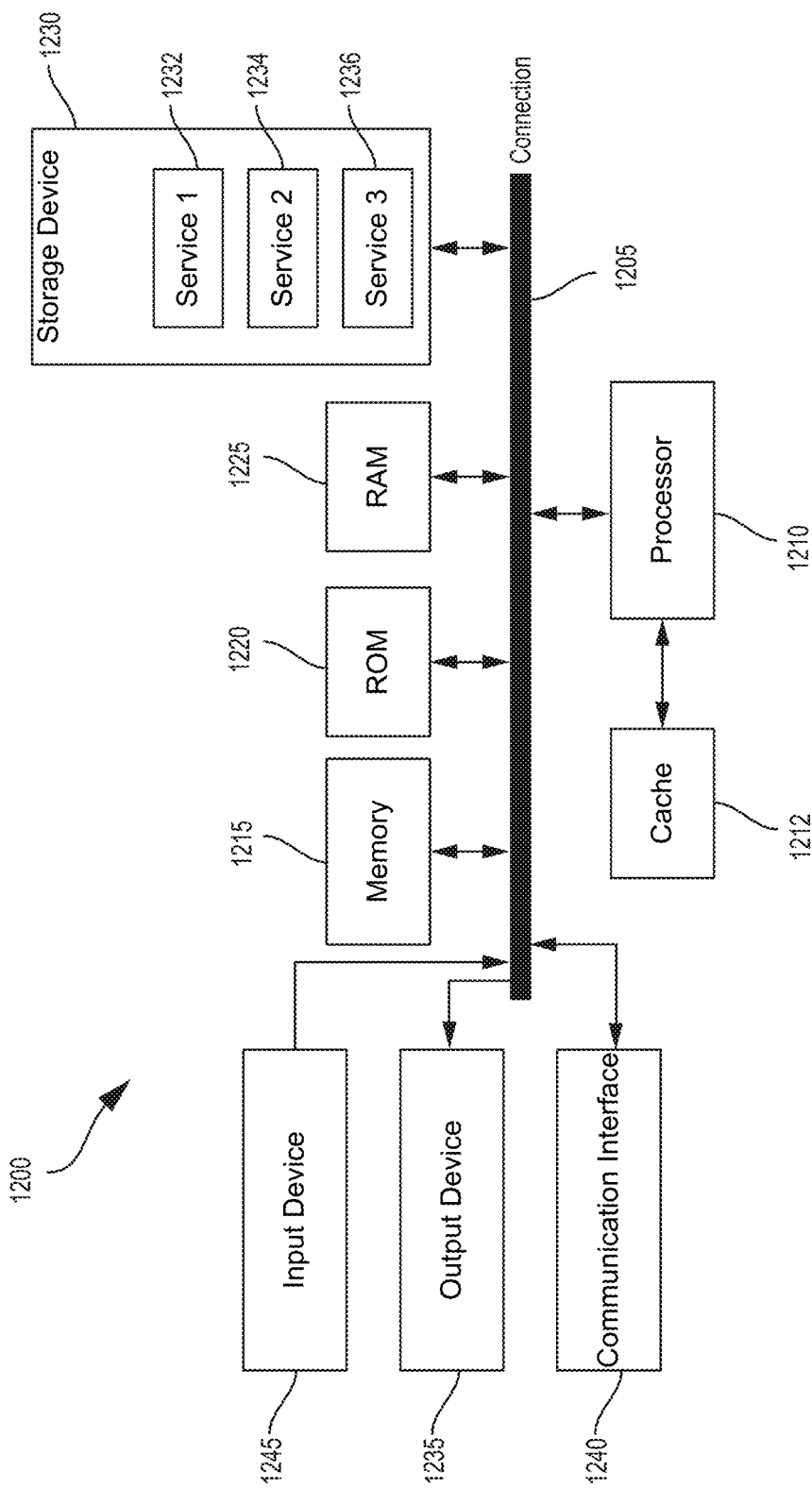
FIG. 12 is a block diagram illustrating an example of a computing system, according to aspects of the disclosure.

FIG. 12 is a diagram illustrating an example of a system for implementing certain aspects of the present technology. In particular, FIG. 12 illustrates an example of computing system 1200, which may be for example any computing device making up internal computing system, a remote computing system, a camera, or any component thereof in which the components of the system are in communication with each other using connection 1205. Connection 1205 may be a physical connection using a bus, or a direct connection into processor 1210, such as in a chipset architecture. Connection 1205 may also be a virtual connection, networked connection, or logical connection.

In some embodiments, computing system 1200 is a distributed system in which the functions described in this disclosure may be distributed within a datacenter, multiple data centers, a peer network, etc. In some embodiments, one or more of the described system components represents many such components each performing some or all of the function for which the component is described. In some embodiments, the components may be physical or virtual devices.

Example system 1200 includes at least one processing unit (CPU or processor) 1210 and connection 1205 that communicatively couples various system components including system memory 1215, such as read-only memory (ROM) 1220 and random access memory (RAM) 1225 to processor 1210. Computing system 1200 may include a cache 1212 of high-speed memory connected directly with, in close proximity to, or integrated as part of processor 1210.

Processor 1210 may include any general purpose processor and a hardware service or software service, such as services 1232, 1234, and 1236 stored in storage device 1230, configured to control processor 1210 as well as a special-purpose processor where software instructions are incorporated into the actual processor design. Processor 1210 may essentially be a completely self-contained computing system, containing multiple cores or processors, a bus, memory controller, cache, etc. A multi-core processor may be symmetric or asymmetric.

To enable user interaction, computing system 1200 includes an input device 1245, which may represent any number of input mechanisms, such as a microphone for speech, a touch-sensitive screen for gesture or graphical input, keyboard, mouse, motion input, speech, etc. Computing system 1200 may also include output device 1235, which may be one or more of a number of output mechanisms. In some instances, multimodal systems may enable a user to provide multiple types of input/output to communicate with computing system 1200.

Computing system 1200 may include communications interface 1240, which may generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN)

signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1240 may also include one or more Global Navigation Satellite System (GNSS) receivers or transceivers that are used to determine a location of the computing system 1200 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1230 may be a non-volatile and/or non-transitory and/or computer-readable memory device and may be a hard disk or other types of computer readable media which may store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L#) cache), resistive random-access memory (RRAM/Re-RAM), phase change memory (PCM), spin transfer torque RAM (STT-RAM), another memory chip or cartridge, and/or a combination thereof.

The storage device 1230 may include software services, servers, services, etc., that when the code that defines such software is executed by the processor 1210, it causes the system to perform a function. In some embodiments, a hardware service that performs a particular function may include the software component stored in a computer-readable medium in connection with the necessary hardware components, such as processor 1210, connection 1205, output device 1235, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Specific details are provided in the description above to provide a thorough understanding of the embodiments and examples provided herein, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments may be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual embodiments may be described above as a process or method which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

Processes and methods according to the above-described examples may be implemented using computer-executable instructions that are stored or otherwise available from computer-readable media. Such instructions may include, for example, instructions and data which cause or otherwise configure a general purpose computer, special purpose computer, or a processing device to perform a certain function or group of functions. Portions of computer resources used may be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some embodiments the computer-readable storage devices, mediums, and memories may include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and may take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also may be embodied in peripherals or add-in cards. Such functionality may also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that may be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein may be replaced with less than or equal to ("≤") and greater than or equal to ("≥") symbols, respectively, without departing from the scope of this description.

Where components are described as being "configured to" perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B.

Illustrative examples of the disclosure include:

Aspect 1. A wireless communication device for wireless communications, comprising: at least one memory; and at least one processor coupled to the at least one memory and configured to: determine that a prospective position of the wireless communication device is in a geographic area associated with a deficient synchronization source signal; and transmit a sidelink synchronization signal to at least one user equipment (UE) device that is located within the geographic area associated with the deficient synchronization source signal.

Aspect 2. The wireless communication device of Aspect 1, wherein the geographic area associated with the deficient synchronization source signal includes geographic area associated with a deficient global navigation satellite system (GNSS) signal and a deficient base station signal.

Aspect 3. The wireless communication device of any of Aspects 1 to 2, wherein the at least one processor is further configured to: associate with the at least one UE device to form a UE platoon; and identify the wireless communication device as a sidelink synchronization source for the UE platoon based on a position of the wireless communication device relative to the at least one UE device, wherein the sidelink synchronization source is configured to transmit a sidelink synchronization signal while at least a portion of the UE platoon is in the geographic area.

Aspect 4. The wireless communication device of Aspect 3, wherein the position of the wireless communication device is behind the at least one UE device.

Aspect 5. The wireless communication device of any of Aspects 3 to 4, wherein associating with the at least one UE device to form the UE platoon is based on at least one of a UE direction of travel, a UE lane position, a UE speed, a UE capability, and a UE locality.

Aspect 6. The wireless communication device of any of Aspects 1 to 5, wherein the at least one processor is further configured to: receive, from a base station, an indication of the geographic area associated with the deficient synchronization source signal.

Aspect 7. The wireless communication device of any of Aspects 1 to 6, wherein to determine that the prospective position of the wireless communication device is in the geographic area the at least one processor is further configured to: receive, from a base station, an indication that a current position of the wireless communication device is within a threshold distance of the geographic area.

Aspect 8. The wireless communication device of Aspect 7, wherein the indication includes a request to transmit the sidelink synchronization signal.

Aspect 9. The wireless communication device of any of Aspects 1 to 8, wherein the at least one processor is further configured to: determine that a current position of the wireless communication device is within a threshold distance of the geographic area for transmission of the sidelink synchronization signal.

Aspect 10. The wireless communication device of any of Aspects 1 to 9, wherein the at least one processor is further configured to: identify the geographic area using a machine learning image classification algorithm.

Aspect 11. The wireless communication device of any of Aspects 1 to 10, wherein the at least one processor is further configured to: identify the geographic area using GNSS signal quality data received from a plurality of UE devices.

Aspect 12: A method of performing any of the operations of Aspects 1 to 11.

Aspect 13: A computer-readable storage medium storing instructions that, when executed, cause one or more processors to perform any of the operations of Aspects 1 to 11.

Aspect 14: An apparatus comprising means for performing any of the operations of Aspects 1 to 11.

Aspect 15: A wireless communication device for wireless communications, comprising: at least one memory; and at least one processor coupled to the at least one memory and configured to: receive a request to associate with at least one UE device to form a UE platoon; identify the wireless communication device as a sidelink synchronization source for the UE platoon based on a position of the wireless communication device relative to the at least one UE device; and transmit a first sidelink synchronization signal while at least a portion of the UE platoon is in a geographic area associated with a deficient synchronization source signal.

Aspect 16: The wireless communication device of Aspect 15, wherein the geographic area associated with the deficient synchronization source signal includes geographic area associated with a deficient global navigation satellite system (GNSS) signal and a deficient base station signal.

Aspect 17. The wireless communication device of any of Aspects 15 to 16, wherein the at least one processor is further configured to: discontinue transmission of the first sidelink synchronization signal in response to determining that the at least one UE device has exited the geographic area.

Aspect 18. The wireless communication device of Aspect 17, wherein the at least one processor is further configured to: receive a second sidelink synchronization signal from the at least one UE device.

Aspect 19: The wireless communication device of any of Aspects 15 to 18, wherein the at least one processor is further configured to: receive an indication of the geographic area from the at least one UE device.

Aspect 20: The wireless communication device of any of Aspects 15 to 19, wherein the position of the wireless communication device is behind the at least one UE device.

Aspect 21: A method of performing any of the operations of Aspects 15 to 20.

Aspect 22: A computer-readable storage medium storing instructions that, when executed, cause one or more processors to perform any of the operations of Aspects 15 to 20.

Aspect 23: An apparatus comprising means for performing any of the operations of Aspects 15 to 20.

What is claimed is:

1. A method for wireless communications, comprising:
   determining that a prospective position of a user equipment (UE) device is in a geographic area associated with a deficient synchronization source signal;
   transmitting a sidelink synchronization signal to at least one other UE device that is located within the geographic area associated with the deficient synchronization source signal; and
   discontinuing transmission of the sidelink synchronization signal in response to determining that the at least one other UE device has exited the geographic area.

2. The method of claim 1, wherein the geographic area associated with the deficient synchronization source signal includes geographic area associated with a deficient global navigation satellite system (GNSS) signal and a deficient base station signal.

3. The method of claim 1, further comprising:
   associating with the at least one other UE device to form a UE platoon; and
   identifying the UE device as a sidelink synchronization source for the UE platoon based on a position of the UE device relative to the at least one other UE device, wherein the sidelink synchronization source is configured to transmit a sidelink synchronization signal while at least a portion of the UE platoon is in the geographic area.

4. The method of claim 3, wherein the position of the UE device is behind the at least one other UE device.

5. The method of claim 3, wherein associating with the at least one other UE device to form the UE platoon is based on at least one of a UE direction of travel, a UE lane position, a UE speed, a UE capability, and a UE locality.

6. The method of claim 1, further comprising:
   receiving, from a base station, an indication of the geographic area associated with the deficient synchronization source signal.

7. The method of claim 1, wherein determining that the prospective position of the UE device is in the geographic area further comprises:
   receiving, from a base station, an indication that a current position of the UE device is within a threshold distance of the geographic area.

8. The method of claim 7, wherein the indication includes a request to transmit the sidelink synchronization signal.

9. The method of claim 1, further comprising:
   determining that a current position of the UE device is within a threshold distance of the geographic area for transmission of the sidelink synchronization signal.

10. The method of claim 1, further comprising:
    identifying the geographic area using a machine learning image classification algorithm.

11. The method of claim 1, further comprising:
    identifying the geographic area using GNSS signal quality data received from a plurality of UE devices.

12. A wireless communication device for wireless communications, comprising:
    at least one memory; and
    at least one processor coupled to the at least one memory and configured to:
    determine that a prospective position of the wireless communication device is in a geographic area associated with a deficient synchronization source signal;
    transmit a sidelink synchronization signal to at least one user equipment (UE) device that is located within the geographic area associated with the deficient synchronization source signal; and
    discontinue transmission of the sidelink synchronization signal in response to determining that the at least one other UE device has exited the geographic area.

13. The wireless communication device of claim 12, wherein the geographic area associated with the deficient synchronization source signal includes geographic area associated with a deficient global navigation satellite system (GNSS) signal and a deficient base station signal.

14. The wireless communication device of claim 12, wherein the at least one processor is further configured to:
    associate with the at least one UE device to form a UE platoon; and
    identify the wireless communication device as a sidelink synchronization source for the UE platoon based on a position of the wireless communication device relative to the at least one UE device, wherein the sidelink synchronization source is configured to transmit a sidelink synchronization signal while at least a portion of the UE platoon is in the geographic area.

15. The wireless communication device of claim 14, wherein associating with the at least one UE device to form the UE platoon is based on at least one of a UE direction of travel, a UE lane position, a UE speed, a UE capability, and a UE locality.

16. The wireless communication device of claim 12, wherein the at least one processor is further configured to:
    receive, from a base station, an indication of the geographic area associated with the deficient synchronization source signal.

17. The wireless communication device of claim 12, wherein to determine that the prospective position of the wireless communication device is in the geographic area the at least one processor is further configured to:
    receive, from a base station, an indication that a current position of the wireless communication device is within a threshold distance of the geographic area, wherein the indication includes a request to transmit the sidelink synchronization signal.

18. The wireless communication device of claim 12, wherein the at least one processor is further configured to:
    determine that a current position of the wireless communication device is within a threshold distance of the geographic area for transmission of the sidelink synchronization signal.

19. A method of wireless communications, comprising:
    receiving, by a user equipment (UE) device, a request to associate with at least one other UE device to form a UE platoon;
    identifying the UE device as a sidelink synchronization source for the UE platoon based on a position of the UE device relative to the at least one other UE device;
    transmitting a first sidelink synchronization signal while at least a portion of the UE platoon is in a geographic area associated with a deficient synchronization source signal; and
    discontinuing transmission of the first sidelink synchronization signal in response to determining that the at least one other UE device has exited the geographic area.

20. The method of claim 19, wherein the geographic area associated with the deficient synchronization source signal includes geographic area associated with a deficient global navigation satellite system (GNSS) signal and a deficient base station signal.

21. The method of claim 19, further comprising:
receiving a second sidelink synchronization signal from the at least one other UE device.

22. The method of claim 19, further comprising:
receiving an indication of the geographic area from the at least one other UE device.

23. The method of claim 19, wherein the position of the UE device is behind the at least one other UE device.

24. A wireless communication device for wireless communications, comprising:
at least one memory; and
at least one processor coupled to the at least one memory and configured to:
receive a request to associate with at least one UE device to form a UE platoon;
identify the wireless communication device as a sidelink synchronization source for the UE platoon based on a position of the wireless communication device relative to the at least one UE device;
transmit a first sidelink synchronization signal while at least a portion of the UE platoon is in a geographic area associated with a deficient synchronization source signal; and
discontinue transmission of the first sidelink synchronization signal in response to determining that the at least one UE device has exited the geographic area.

25. The wireless communication device of claim 24, wherein the geographic area associated with the deficient synchronization source signal includes geographic area associated with a deficient global navigation satellite system (GNSS) signal and a deficient base station signal.

26. The wireless communication device of claim 24, wherein the at least one processor is further configured to:
receive a second sidelink synchronization signal from the at least one UE device.

27. The wireless communication device of claim 24, wherein the at least one processor is further configured to:
receive an indication of the geographic area from the at least one UE device.

28. The wireless communication device of claim 24, wherein the position of the wireless communication device is behind the at least one UE device.

* * * * *